United States Patent
Fu et al.

(10) Patent No.: US 11,064,445 B2
(45) Date of Patent: Jul. 13, 2021

(54) METHOD AND DEVICE FOR POWER CONTROL

(71) Applicant: Samsung Electronics Co., Ltd., Suwon-si (KR)

(72) Inventors: Jingxing Fu, Beijing (CN); Bin Yu, Beijing (CN); Yi Wang, Beijing (CN); Feifei Sun, Beijing (CN)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 16/779,432

(22) Filed: Jan. 31, 2020

(65) Prior Publication Data

US 2020/0260387 A1 Aug. 13, 2020

(30) Foreign Application Priority Data

Feb. 1, 2019 (CN) .......................... 201910106249.3
Aug. 14, 2019 (CN) .......................... 201910751690.7

(51) Int. Cl.
*H04W 52/28* (2009.01)
*H04W 52/36* (2009.01)
*H04W 52/14* (2009.01)
*H04W 52/16* (2009.01)
*H04W 52/54* (2009.01)

(52) U.S. Cl.
CPC ....... *H04W 52/281* (2013.01); *H04W 52/146* (2013.01); *H04W 52/365* (2013.01)

(58) Field of Classification Search
None
See application file for complete search history.

(56) References Cited

U.S. PATENT DOCUMENTS 10,149,256 B2 12/2018 Lee et al.
2018/0368081 A1 * 12/2018 Akkarakaran ...... H04W 52/242
2018/0368174 A1 * 12/2018 Jeon .................. H04W 72/0446
(Continued)

FOREIGN PATENT DOCUMENTS

CN 108811151 A * 11/2018 ............ H04W 52/32
WO 2014007581 A1 1/2014
(Continued)

OTHER PUBLICATIONS

International Search Report and Written Opinion of the International Searching Authority in connection with International Application No. PCT/KR2020/001318 dated May 8, 2020, 10 pages.
(Continued)

*Primary Examiner* — Mohammed Rachedine

(57) ABSTRACT

The embodiments of the present application propose a method for power control, which is performed by a User Equipment (UE). The method includes: determining whether indication information is received from a base station; determining a power control parameter set for transmitting data with a first priority based on whether the indication information is received; and controlling a transmission power of a channel for transmitting the data with the first priority based on the determined power control parameter set. The embodiments of the present application further propose a corresponding device and a corresponding computer storage medium.

19 Claims, 17 Drawing Sheets

(56) References Cited

U.S. PATENT DOCUMENTS

| | | | | |
|---|---|---|---|---|
| 2019/0141644 A1* | 5/2019 | Ozturk | ............... | H04W 52/34 |
| 2020/0120619 A1* | 4/2020 | Manolakos | ............. | H04L 5/001 |
| 2020/0146032 A1* | 5/2020 | Bae | ................... | H04W 72/1268 |
| 2020/0154481 A1* | 5/2020 | Goto | .................. | H04W 74/004 |

FOREIGN PATENT DOCUMENTS

| | | | | |
|---|---|---|---|---|
| WO | WO-2017049425 A1 * | 3/2017 | ............ | H04W 72/04 |
| WO | WO-2017197063 A1 * | 11/2017 | ............ | H04W 76/11 |
| WO | WO-2019157952 A1 * | 8/2019 | ............ | H04W 52/42 |

OTHER PUBLICATIONS

ASUSTek, "Discussion on power control mechanism for UL inter UE Tx multiplexing," R1-1813513, 3GPP TSG RAN WG1 Meeting #95, Spokane, USA, Nov. 12-16, 2018, 3 pages.

Huawei et al., "UL inter-UE transmission prioritization and multiplexing,", R1-1813926, 3GPP TSG RAN WG1 Meeting #95, Spokane, USA, Nov. 12-16, 2018, 10 pages.

MediaTek Inc., "Power control enhancements for dynamic UL multiplexing between URLLC and eMBB," R1-1812378, 3GPP TSG RAN1 WG1 Meeting #95, Spokane, USA, Nov. 12-16, 2018, 8 pages.

Vivo, "Power control for URLLC," R1-1812317, 3GPP TSG RAN WG1 Meeting #95, Spokane, USA, Nov. 12-16, 2018, 4 pages.

\* cited by examiner

Note 1 : When the UE reports the PHR -2, the PHR-1
is necessarily greater than 0 no matter whether the
PHR-2 is greater than O or is less than or equal to 0
Note 2 : When the UE reports the PHR -1,
the PHR-2 is necessarily less than 0

FIG. 13

| C$_7$ | C$_6$ | C$_5$ | C$_4$ | C$_3$ | C$_2$ | C$_1$ | R |
|---|---|---|---|---|---|---|---|
| P | V | \multicolumn{6}{c}{PH (Second type, SpCell of another MAC entity)} |||||| 
| R | R | \multicolumn{6}{c}{P$_{CMAX,f,c}$ 1} ||||||
| P | V | \multicolumn{6}{c}{PH (First type, PCell)} ||||||
| R | R | \multicolumn{6}{c}{P$_{CMAX,f,c}$ 2} ||||||
| P | V | \multicolumn{6}{c}{PH (X$^{th}$ type, Serving cell 1)} ||||||
| R | R | \multicolumn{6}{c}{P$_{CMAX,f,c}$ 3} ||||||

...

| P | V | PH (X$^{th}$ type, Serving cell n) |
|---|---|---|
| R | R | P$_{CMAX,f,c}$ m |

METHOD AND DEVICE FOR POWER CONTROL

CROSS-REFERENCE TO RELATED APPLICATIONS

The application is based on and claims priority under 35. U.S.C. 119 to Chinese Application Number 201910106249.3 filed on Feb. 1, 2019; Chinese Application Number 201910751690.7 filed on Aug. 14, 2019. The disclosure of which is herein incorporated by reference in its entirety.

BACKGROUND

1. Field

The present application relates to the field of wireless communication technology, and more particularly, the present application relates to a method and device for power control and a storage medium.

2. Description of Related Art

To meet the demand for wireless data traffic having increased since deployment of 4th generation (4G) communication systems, efforts have been made to develop an improved 5th generation (5G) or pre-5G communication system. The 5G or pre-5G communication system is also called a 'beyond 4G network' or a 'post long term evolution (LTE) system'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), full dimensional MIMO (FD-MIMO), array antenna, an analog beamforming, and large scale antenna techniques are discussed with respect to 5G communication systems. In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In the 5G system, hybrid frequency shift keying (FSK) and Feher's quadrature amplitude modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of things (IoT) where distributed entities, such as things, exchange and process information without human intervention. The Internet of everything (IoE), which is a combination of the IoT technology and the big data processing technology through connection with a cloud server, has emerged. As technology elements, such as "sensing technology", "wired/wireless communication and network infrastructure", "service interface technology", and "security technology" have been demanded for IoT implementation, a sensor network, a machine-to-machine (M2M) communication, machine type communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

In line with this, various attempts have been made to apply 5G communication systems to IoT networks. For example, technologies such as a sensor network, MTC, and M2M communication may be implemented by beamforming, MIMO, and array antennas. Application of a cloud RAN as the above-described big data processing technology may also be considered to be as an example of convergence between the 5G technology and the IoT technology.

As described above, various services can be provided according to the development of a wireless communication system, and thus a method for easily providing such services is required.

SUMMARY

To this end, the embodiments of the present application provide a method and device for power control and a storage medium.

According to a first aspect of the present application, there is proposed a method for power control, comprising: determining whether indication information is received from a base station; determining a power control parameter set for transmitting data with a first priority based on whether the indication information is received; and controlling a transmission power of a channel for transmitting the data with the first priority based on the determined power control parameter set.

In some embodiments, determining a power control parameter set for transmitting data with a first priority based on whether the indication information is received comprises: if the indication information is received, determining whether the data with the first priority is transmitted on idle resources or on resources which have been occupied by data with a second priority based on the indication information; and if the data with the first priority is transmitted on the idle resources, determining that the power control parameter set is a first power control parameter set for setting a first power, and if the data with the first priority is transmitted on the resources which have been occupied by the data with the second priority, determining that the power control parameter set is a second power control parameter set for setting a second power, wherein the second power is greater than the first power, and a priority of the transmission of the data with the first priority is higher than that of the transmission of the data with the second priority; and if the indication information is not received, determining, by default, that the data with the first priority is transmitted on the resources which have been occupied by the data with the second priority; and selecting a corresponding power control parameter set based on the default determination.

In some embodiments, the method further comprises: reporting a transmission power margin to the base station, wherein the indication information is generated by the base station based on the reported power margin.

In some embodiments, the data with the first priority may be Ultra Reliability Low Latency Communication (URLLC) data, and data with a second priority is enhanced Mobile BroadBand (eMBB) data.

According to a second aspect of the present application, there is proposed a method for reporting a transmission power margin of a User Equipment (UE), wherein a power control parameter set of the UE comprises a first power control parameter set for setting a first power and a second power control parameter set for setting a second power, wherein the second power is greater than the first power, the method comprising: calculating a difference value between the first power and a maximum transmission power of the UE as a first power margin; calculating a second difference value between the second power and the maximum transmission power of the UE as a second power margin; comparing the first power margin and the second power margin with 0; and reporting the transmission power margin to the base station based on a comparison result.

In some embodiments, reporting the transmission power margin to the base station based on a comparison result comprises at least one of: when the first power margin is less than 0 and the second power margin is less than 0, reporting the first power margin to the base station; when the first power margin is greater than 0 and the second power margin is greater than 0, reporting the second power margin to the base station; and when the first power margin is greater than 0 and the second power margin is less than 0, reporting the first power margin or the second power margin to the base station.

In some embodiments, the method further comprises: comparing the first power margin with a first threshold value and/or comparing the second power margin with a second threshold value; and when the first power margin is less than the first threshold value and/or the second power margin is less than the second threshold value, triggering the reporting of the power margin to the base station.

According to a third aspect of the present application, there is proposed a method for power control, comprising: generating indication information related to a power control parameter set of a channel for transmitting data with a first priority; and transmitting the indication information to a User Equipment (UE).

In some embodiments, the method further comprises: receiving a power margin report from the UE, wherein generating indication information comprises: generating the indication information based on the received power margin report.

In some embodiments, the power control parameter set comprises a first power control parameter set for setting a first power and a second power control parameter set for setting a second power, wherein the second power is greater than the first power, and generating the indication information based on the received power margin report comprises:

if the power margin comprises a first power margin indicating a difference value between the first power and a maximum transmission power of the UE and the first power margin is less than 0, indicating, in the indication information, scheduling parameters for adjusting the channel for transmitting the data with the first priority, and instructing to transmit the data with the first priority on idle resources;

if the power margin comprises a second power margin indicating a second difference value between the second power and the maximum transmission power of the UE and the second power margin is greater than 0, instructing, in the indication information, to transmit the data with the first priority on resources which have been occupied by data with a second priority; and if the power margin comprises the second power margin indicating the second difference value between the second power and the maximum transmission power of the UE and the second power margin is less than 0, or if the power margin comprises the first power margin indicating the difference value between the first power and the maximum transmission power of the UE and the first power margin is greater than 0, instructing, in the indication information, to transmit the data with the first priority on the idle resources.

According to a fourth aspect of the present application, there is provided a User Equipment (UE), comprising: a receiving determination module configured to determine whether indication information is received from a base station, a control parameter set determination module configured to determine a power control parameter set for transmitting data with a first priority based on whether the indication information is received; and a power control module configured to control a transmission power of a channel for transmitting the data with the first priority based on the determined power control parameter set.

According to a fifth aspect of the present application, there is provided a User Equipment (UE), wherein a power control parameter set of the UE comprises a first power control parameter set for setting a first power and a second power control parameter set for setting a second power, wherein the second power is greater than the first power, the UE comprising: a first power margin calculation module configured to calculate a difference value between the first power and a maximum transmission power of the UE as a first power margin; a second power margin calculation module configured to calculate a second difference value between the second power and the maximum transmission power of the UE as a second power margin; a comparison module configured to compare the first power margin and the second power margin with 0; and a power margin reporting module configured to report a transmission power margin to the base station based on a comparison result.

According to a sixth aspect of the present application, there is provided a base station, comprising: an indication information generation module configured to generate indication information related to a power control parameter set of a channel for transmitting data with a first priority; and a transmission module configured to transmit the indication information to a User Equipment (UE).

According to a seventh aspect of the present application, there is provided a user equipment, comprising: a processing unit; and a storage unit configured to store machine-readable instructions which, when executed by the processing unit, configure the processing unit to execute the method according to the first aspect.

According to an eighth aspect of the present application, there is provided a base station, comprising: a processing unit; and a storage unit configured to store machine-readable instructions which, when executed by the processing unit, configure the processing unit to execute the method according to the second aspect.

According to a ninth aspect of the present application, there is provided a computer-readable storage medium having stored thereon executable instructions which, when executed by a processor, cause the processor to execute the method according to the first or second aspect.

With the indication information related to the power control parameter set of the channel for transmitting the data with the first priority, the user equipment according to the embodiments of the present application may determine the parameter set used for the power control.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and additional aspects and advantages of the present application will become more apparent and easily understood through the following description in conjunction with the accompanying drawings, in which:

FIG. 13 illustrates a schematic structural diagram of a data packet used for reporting a PHR according to an exemplary embodiment;

Figure 1:
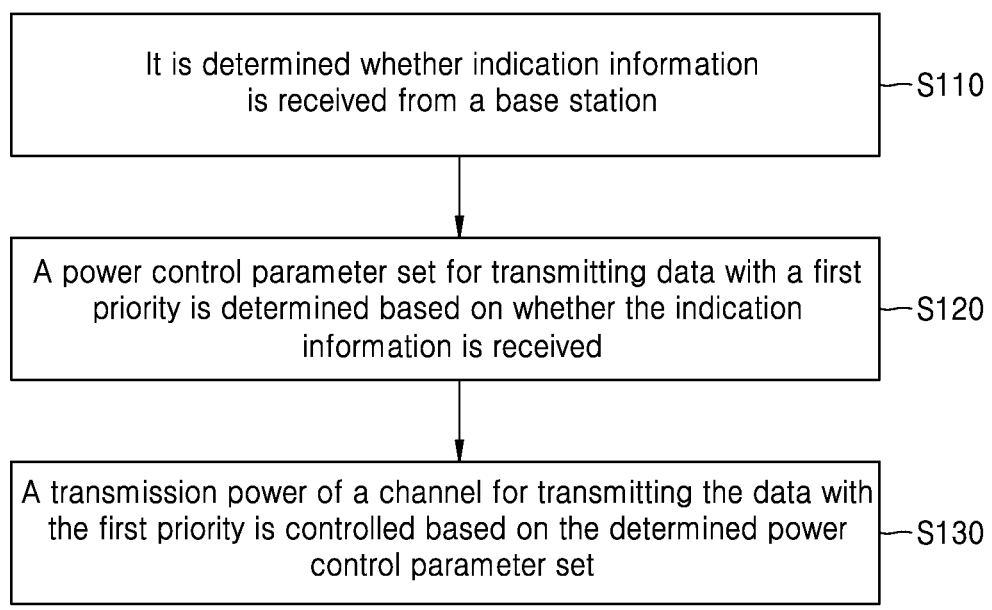
FIG. 1 illustrates a schematic flowchart of a method for power control according to an exemplary embodiment.

In the accompanying drawings, the same or similar structures are identified by the same or similar reference signs.

DETAILED DESCRIPTION

FIGS. 1 through 17, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

The embodiments of the present application will be described in detail below, and examples of the embodiments are illustrated in the accompanying drawings, throughout which the same or similar reference signs are used to refer to the same or similar elements or elements having the same or similar functions. The embodiments described below with reference to the accompanying drawings are intended to be illustrative only, and are merely used to explain the present application, but should not be construed as limiting the present application.

It can be understood by those skilled in the art that singular forms "a", "an", "the" used here may also comprise plural forms, unless otherwise stated. It should also be understood that phrase "comprise" used in the specification of the present application refers to presence of the features, integers, steps, operations, elements and/or components, but should not preclude the presence or addition of one or more other features, integers, steps, operations, elements, components, and/or groups thereof. It should be understood that when an element is referred to as being "connected" or "coupled" to another element, it may be directly connected or coupled to the other element, or there may be an intermediate element therebetween. Further, "connected" or "coupled" as used here may comprise either a wireless connection or a wireless coupling. The phrase "and/or" used here comprises all or any of one or more of associated listed items, or all combinations thereof.

It can be understood by those skilled in the art that all terms (comprising technical and scientific terms) used here have the same meaning as commonly understood by those of ordinary skill in the art to which the present application belongs, unless otherwise defined. It should also be understood that terms such as those defined in a general dictionary should be understood to have meaning consistent with the meaning in the context of the related art, and will not be explained as an idealized or excessively formal meaning unless specifically defined as here.

It can be understood by those skilled in the art that the "terminal" and "terminal device" used here comprise not only a wireless signal receiver device, which has only a wireless signal receiver without a transmitting capability, but also comprise a receiving and transmitting hardware device which is capable of two-way communication over a two-way communication link. Such a device may comprise: a cellular or other communication device which may comprise a single line display or a multi-line display or may not comprise a multi-line display; a Personal Communication Service (PCS), which may comprise voice, data processing, fax, and/or data communication capabilities; a Personal Digital Assistant (PDA), which may comprise a radio frequency receiver, a pager, Internet/Intranet access, a web browser, a notepad, a calendar, and/or a Global Positioning System (GPS) receiver; and a conventional laptop and/or palmtop computer or other device having and/or comprising a radio frequency receiver. The "terminal" and "terminal device" used here may be portable, transportable, installed in transportations (aviation transportations, sea transportations and/or land transportations), or adapted and/or configured to operate locally, and/or operate in any other location on the earth and/or space in a distributed form. The "terminal" and "terminal device" used here may also be communication terminals, internet terminals, or music/video playing terminals, for example, PDAs, Mobile Internet Devices (MIDs), and/or mobile phones having music/video playback functions, or may also be devices such as smart TVs, set-top boxes etc.

In a Long Term Evolution (LTE) communication system, a User Equipment (UE) may transmit uplink data with different priorities in one or more serving cells at the same time, for example, the UE may transmit Enhanced Mobile Broadband (eMBB) data and Ultra Reliability Low Latency Communication (URLLC) data at the same time, wherein a priority of the transmission of the URLLC data is higher than that of the transmission of the eMBB data. In order to make full use of resources for the transmission of the two types of data, if the eMBB data has occupied all transmission resources while the URLLC data needs to be transmitted, a transmission power of the URLLC data may be increased to transmit the URLLC data on resources which have been occupied by the eMBB data. In this way, two or more power control parameter sets are configured for a PUSCH for the transmission of the URLLC data, and are used when the URLLC data is transmitted on idle resources or when the URLLC data is transmitted on the resources which have been occupied by the eMBB data respectively.

Therefore, there is a need for a method and device for determining a specific type of power control parameter set to be used by a UE for power control.

In an LTE system, a larger working bandwidth is obtained by combining multiple Component Carriers (CCs). Each CC may also be referred to as a serving cell, and forms a downlink and an uplink of a communication system, which is Carrier Aggregation (CA) technology, to support higher transmission rates. For a UE, when a CA mode is configured, one cell is a Primary cell (Pcell), and other cells are referred to as Secondary Cells (Scells). According to an LTE method, a PUSCH may be transmitted on all uplink serving cells, while a PUCCH is transmitted on a primary cell or a designated uplink secondary cell. Uplink transmission is that a User Equipment (UE) transmits information to a base station, and the base station receives the information transmitted by the UE; and downlink transmission is that a base station transmits information to a UE, and the UE receives the information which is transmitted by the base station.

According to existing LTE specifications, a transmission power of a PUCCH channel in a subframe i on a serving cell c is determined according to the following formula:

$$P_{PUCCH}(i) = \min \begin{Bmatrix} P_{CMAX,c}(i), \\ P_{0\_PUCCH} + PL_c + h(n_{CQI}, n_{HARQ}, n_{SR}) + \Delta_{F\_PUCCH}(F) + \Delta_{TxD}(F') + g(i) \end{Bmatrix} [dBm]$$

wherein definitions of respective parameters in the formula are detailed in chapter 5.1.2.1 of version 10.9.0 of the 3rd Generation Partnership Project (3GPP) specification 36.213, and will be briefly described as follows: $P_{CMAX,c}(i)$ is a maximum transmission power on the configured serving cell c of the UE;

$\Delta_{F\_PUCCH}(F)$ is a power deviation relative to a reference format (the reference format is PUCCH format 1a in the LTE);

$\Delta_{TxD}(F')$ is a parameter related to the PUCCH format and whether to use transmit diversity;

$PL_c$ is a path loss;

$P_{O\_PUCCH}$ is a power offset value configured by higher layer signaling;

g(i) is an accumulated value of closed loop power control;

$h(n_{CQI}, n_{HARQ}, n_{SR})$ is a power offset, which is related to the PUCCH format, and is related to a number of bits of Uplink Control Information (UCI) which needs to be fed back, $n_{CQI}$ is a number of bits of Channel State Information (CSI) to be fed back in the subframe i, $n_{SR}$ is a number of bits of a Scheduling Request (SR) to be fed back in the subframe i, and has a value of 0 or 1, and nHARQ is a number of bits of HARQ-ACK to be actually fed back in the subframe i. For example, for PUCCH format 3, when CSI needs to be fed back, $$h(n_{CQI}, n_{HARQ}, n_{SR}) = \frac{n_{HARQ} + n_{SR} + n_{CQI} - 1}{3}.$$

According to the existing LTE specifications, the transmission power of the PUSCH channel in the subframe i on the serving cell c is determined according to the following formula:

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \alpha_c(j) \cdot PL_c + \Delta_{TF,c}(i) + f_c(i) \end{Bmatrix} [dBm]$$

wherein definitions of respective parameters in the formula are detailed in chapter 5.1.1.1 of version 10.9.0 of the 3GPP specification 36.213, and will be briefly described as follows:

$P_{CMAX,c}(i)$ is a maximum transmission power in the subframe i on the configured serving cell c of the UE;

$M_{PUSCH,c}(i)$ is a number of Physical Resource Blocks (PRBs) occupied by the PUSCH;

$P_{O\_PUSCH,c}(j)$ is a power offset value configured by higher layer signaling;

$PL_c$ is a path loss;

$\alpha_c(j)$ is to control all or a part of compensation for the path loss, wherein j=0 for retransmission of the PUSCH or the PUSCH which is semi-persistently scheduled (SPS), j=1 for retransmission of the PUSCH or the PUSCH which is dynamically scheduled, and j=2 for retransmission of the PUSCH or the PUSCH which is scheduled by a Random Access Response (RAR);

$f_c(i)$ is an accumulated value of closed loop power control;

$\Delta_{TF,c}(i)$ is a parameter related to a Modulation and Coding Scheme (MCS) of uplink transmission. Specifically, when the parameter Ks is equal to 1.25, $\Delta_{TF,c}(i)=10 \log_{10}((2^{BPRE \cdot K_s}-1) \cdot \beta_{offset}^{PUSCH})$. For a case where only Aperiodic Channel State Information (A-CSI) is transmitted but uplink data is not transmitted, BPRE=$O_{CQI}/N_{RE}$ and $\beta_{offset}^{PUSCH}=\beta_{offset}^{CQI}$; and for a case where uplink data is transmitted, $$BPRE = \sum_{r=0}^{C-1} K_r/N_{RE}$$

and $\beta_{offset}^{PUSCH}=1$, wherein C is a number of Code Blocks (CBs) which is obtained by dividing one Transmission Block (TB), $K_r$ is a number of bits of a rth CB, and $N_{RE}$ is a total number of Resource Elements (REs) included in the PUSCH channel.

In order to provide a reference for the base station to schedule uplink resources, the UE reports a remaining power margin in a case of specified scheduling through a Power Headroom Report (PHR). According whether a UE is configured to transmit the PUSCH and the PUCCH in the same subframe at the same time, it is determined whether to report only a first type of PHR, or report the first type of PHR and a second type of PHR at the same time. That is, if the UE is configured to transmit the PUSCH and the PUCCH in the same subframe at the same time, the UE reports the first type of PHR and the second type of PHR to a serving cell which reports the PUCCH, and if the UE is not configured to transmit the PUSCH and the PUCCH in the same subframe at the same time, the UE reports only the first type of PHR to the serving cell which reports the PUCCH. Methods for calculating the first type of PHR and the second type of PHR will be described below respectively.

(1) A Method for Calculating the First Type of PHR:

If the UE transmits the PUSCH without transmitting the PUCCH in the subframe i on the serving cell c, the first type of PHR is calculated using the following formula:

$PH_{type1,c}(i)=P_{CMAX,c}(i)-\{10 \log_{10}(M_{PUSCH,c}(i))+P_{O\_PUSCH,c}(j)+\alpha_c(j)\cdot PL_c+\Delta_{TF,c}(i)+f_c(i)\}$ [dB]

wherein definitions of respective parameters in the formula are detailed in chapter 5.1.1.1 of version 10.9.0 of the 3GPP specification 36.213.

If the UE transmits the PUSCH and the PUCCH in the subframe i on the serving cell c at the same time, the first type of PHR is calculated using the following formula:

$PH_{type1,c}(i)=\tilde{P}_{CMAX,c}(i)-\{10 \log_{10}(M_{PUSCH,c}(i))+P_{O\_PUSCH,c}(j)+\alpha_c(j)\cdot PL_c+\Delta_{TF,c}(i)+f_c(i)\}$ [dB]

wherein definitions of $M_{PUSCH,c}(i)$, $P_{O\_PUSCH,c}(j)$, $\alpha_c(j)$, $PL_c$, $\Delta_{TF,c}(i)$ and $f_c(i)$ are detailed in chapter 5.1.1.1 of version 10.9.0 of the 3GPP specification 36.213. $\tilde{P}_{CMAX,c}(i)$ is a maximum transmission power of the PUSCH which is calculated under the assumption that the UE transmits only the PUSCH in the subframe i on the serving cell c.

If the UE does not transmit the PUSCH in the subframe i on the serving cell c, the first type of PHR is calculated using the following formula:

$PH_{type1,c}(i)=\tilde{P}_{CMAX,c}(i)-\{P_{O\_PUSCH,c}(1)+\alpha_c(1)\cdot PL_c+f_c(i)\}$ [dB]

Definitions of respective parameters in the formula are detailed in chapter 5.1.1.1 of version 10.9.0 of the 3GPP specification 36.213.

(2) A Method for Calculating the Second Type of PHR:

If the UE transmits both the PUSCH and the PUCCH in the subframe i on the serving cell c at the same time, the type 2 PHR is calculated using the following formula:

$$PH_{type2}(i) = P_{CMAX,c}(i) - 10\log_{10}\begin{pmatrix} 10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{O\_PUCCH}+PL_c+h(n_{CQI},n_{HARQ},n_{SR})+\Delta_{F\_PUCCH}(F)+\Delta_{TxD}(F')+g(i))/10} \end{pmatrix} [dB]$$

wherein definitions of $M_{PUSCH,c}(i)$, $P_{O\_PUSCH,c}(j)$, $\alpha_c(j)$, $PL_c$, $\Delta^{TF,c}(i)$ and $f_c(i)$ are detailed in chapter 5.1.1.1 of version 10.9.0 of the 3GPP specification 36.213, and definitions of $P_{O\_PUCCH}$, $PL_c$, $h(n_{CQI}, n_{HARQ}, n_{SR})$, $\Delta_{F\_PUCCH}(F)$, $\Delta_{TxD}(F')$ and $g(i)$ are detailed in chapter 5.1.2.1 of version 10.9.0 of the 3GPP specification 36.213.

If the UE transmits the PUSCH without transmitting the PUCCH in the subframe i on the serving cell c, the second type of PHR is calculated using the following formula:

$$PH_{type2}(i) = P_{CMAX,c}(i) - 10\log_{10}\left(\begin{array}{l}10^{(10\log_{10}(M_{PUSCH,c}(i))+P_{O\_PUSCH,c}(j)+\alpha_c(j)\cdot PL_c+\Delta_{TF,c}(i)+f_c(i))/10} + \\ 10^{(P_{0\_PUCCH}+PL_c+g(i))/10}\end{array}\right)[dB]$$

wherein definitions of $M_{PUSCH,c}(i)$, $P_{O\_PUSCH,c}(j)$, $\alpha_c(\ )$, $PL_c$, $\Delta_{TF,c}(i)$ and $f_c(i)$ are detailed in chapter 5.1.1.1 of version 10.9.0 of the 3GPP specification 36.213, and definitions of $P_{O\_PUCCH}$, $PL_c$ and $g(i)$ are detailed in chapter 5.1.2.1 of version 10.9.0 of the 3GPP specification 36.213.

If the UE transmits the PUCCH without transmitting the PUSCH in the subframe i on the serving cell c, the second type of PHR is calculated using the following formula:

$$PH_{type2}(i) = P_{CMAX,c}(i) - 10\log_{10}\left(\begin{array}{l}10^{(P_{O\_PUSCH,c}(1)+\alpha_c(1)\cdot PL_c+f_c(i))/10} + \\ 10^{(P_{0\_PUCCH}+PL_c+h(n_{CQI},n_{HARQ},n_{SR})+\Delta_{F\_PUCCH}(F)+\Delta_{TxD}(F')+g(i))/10}\end{array}\right)[dB]$$

wherein definitions of $P_{O\_PUSCH,c}(1)$, $\alpha_c(1)$, $PL_c$ and $f_c(i)$ are detailed in chapter 5.1.1.1 of version 10.9.0 of the 3GPP specification 36.213, and definitions of $P_{O\_PUCCH}$, $PL_c$, $h(n_{CQI}, n_{HARQ}, n_{SR})$, $\Delta_{F\_PUCCH}(F)$, $\Delta_{TxD}(F')$ and $g(i)$ are detailed in chapter 5.1.2.1 of version 10.9.0 of the 3GPP specification 36.213.

If the UE does not transmit both the PUSCH and the PUCCH in the subframe i on the serving cell c, the second type of PHR is calculated using the following formula:

$$PH_{type2}(i) = \tilde{P}_{CMAX,c}(i) - 10\log_{10}\left(\begin{array}{l}10^{(P_{O\_PUSCH,c}(1)+\alpha_c(1)\cdot PL_c+f_c(i))/10} + \\ 10^{(P_{0\_PUCCH}+PL_c+g(i))/10}\end{array}\right)[dB]$$

wherein definitions of $P_{O\_PUSCH,c}(1)$, $\alpha_c(1)$, $PL_c$ and $f_c(i)$ are detailed in chapter 5.1.1.1 of version 10.9.0 of the 3GPP specification 36.213, and definitions of $P_{O\_PUCCH}$, $PL_c$ and $g(i)$ are detailed in chapter 5.1.2.1 of version 10.9.0 of the 3GPP specification 36.213.

As described above, in order to make full use of resources for the transmission of the two types of data, if the eMBB data has occupied all transmission resources while the URLLC data needs to be transmitted, a transmission power of the URLLC data may be increased to transmit the URLLC data on resources which have been occupied by the eMBB data. In this way, two or more power control parameter sets are configured for a PUSCH for the transmission of the URLLC data, and are used when the URLLC data is transmitted on idle resources or when the URLLC data is transmitted on the resources which have been occupied by the eMBB data respectively.

In order to determine a parameter set for power control, the embodiments of the present application provide a method and device for power control.

FIG. 1 illustrates a schematic flowchart of a method for power control according to an exemplary embodiment. FIG. 1 illustrates a method for power control according to an embodiment of the present application. As shown in FIG. 1, the method comprises the following steps.

In step S110, it is determined whether indication information is received from a base station, by UE.

In step S120, a power control parameter set for transmitting data with a first priority is determined based on whether the indication information is received, by UE.

In step S130, a transmission power of a channel for transmitting the data with the first priority is controlled based on the determined power control parameter set, by UE.

In some embodiments, the UE may determine a power control parameter set for transmitting data with a first priority based on whether the indication information is received.

In one embodiment, If the indication information is received, the UE may determine whether the data with the first priority is transmitted on idle resources or on resources which have been occupied by data with a second priority based on the indication information. For example, if the data with the first priority is transmitted on the idle resources, the UE may determine that the power control parameter set is a first power control parameter set for setting a first power. As another example, if the data with the first priority is transmitted on the resources which have been occupied by the data with the second priority, the UE determine that the power control parameter set is a second power control parameter set for setting a second power, wherein the second power is greater than the first power, and a priority of the transmission of the data with the first priority is higher than that of the transmission of the data with the second priority; and In one embodiment, if the indication information is not received, The UE may determine, by default, that the data with the first priority is transmitted on the resources which have been occupied by the data with the second priority. The UE may select a corresponding power control parameter set based on the default determination.

In some embodiments, The UE report a transmission power margin to the base station, wherein the indication information is generated by the base station based on the reported power margin.

In some embodiments, the power control parameter set may comprise a first power control parameter set for setting a first power and a second power control parameter set for setting a second power, wherein the second power is greater than the first power. The UE may calculate a difference value between the first power and a maximum transmission power of the UE as a first power margin and The UE may calculate a second difference value between the second power and the maximum transmission power of the UE as a second power margin. In one embodiment, the UE may report the transmission power margin to the base station. When the first power margin is less than 0 and the second power margin is less than 0, the UE may report the first power margin to the base station. When the first power margin is greater than 0 and the second power margin is greater than 0, the UE may report the second power margin to the base station. When the first power margin is greater than 0 and the second power margin is less than 0, the UE may report the first power margin or the second power margin to the base station.

In some embodiments, the power control parameter set may comprise a first power control parameter set for setting a first power and a second power control parameter set for setting a second power, wherein the second power is greater than the first power. The UE may calculate a difference value between the first power and a maximum transmission power of the UE as a first power margin. The UE may calculate a second difference value between the second power and the maximum transmission power of the UE as a second power margin.

In some embodiments, the UE may report the transmission power margin to the base station. When the first power margin is less than a first threshold value and/or the second power margin is less than a second threshold value, the UE may trigger the reporting of the power margin to the base station.

The data with the first priority may be Ultra Reliability Low Latency Communication (URLLC) data, and the data with the second priority may be enhanced Mobile Broad-Band (eMBB) data. However, the technical solutions according to the embodiments of the present application are not limited thereto, and may also be used for any other data with different priorities.

Figure 2:
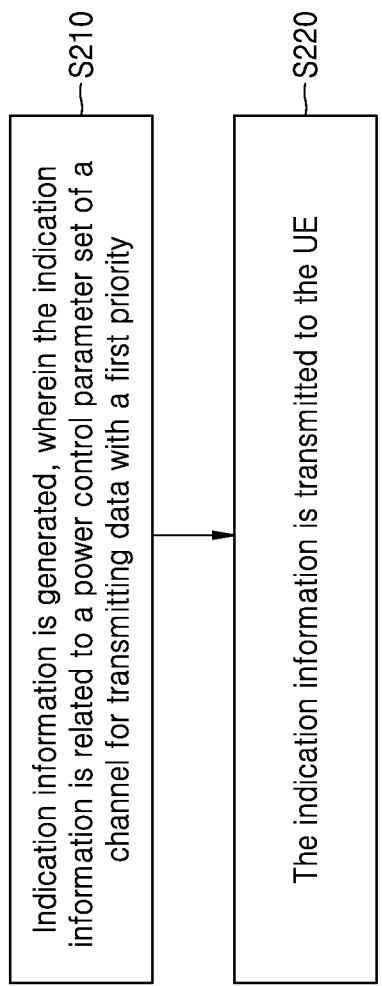
FIG. 2 illustrates a schematic flowchart of another method for power control according to an exemplary embodiment.

FIG. 2 illustrates a schematic flowchart of another method for power control according to an exemplary embodiment. FIG. 2 illustrates another method for power control according to an embodiment of the present application. As shown in FIG. 2, the method comprises the following steps.

In step S210, indication information is generated, wherein the indication information is related to a power control parameter set of a channel for transmitting data with a first priority, by the base station. In step S220, the indication information is transmitted to the UE, by the base station.

In some embodiments, the base station may receive a power margin report from the UE, wherein generating indication information may comprise: generating the indication information based on the received power margin report.

In some embodiments, the power control parameter set may comprise a first power control parameter set for setting a first power and a second power control parameter set for setting a second power, wherein the second power is greater than the first power. In one embodiment, the base station may generate the indication information based on the received power margin report. For example, if the power margin comprises a first power margin indicating a difference value between the first power and a maximum transmission power of the UE and the first power margin is less than 0, the base station may indicate, in the indication information, scheduling parameters for adjusting the channel for transmitting the data with the first priority. Also, the base station may instruct to transmit the data with the first priority on idle resources.

As another example, if the power margin comprises a second power margin indicating a second difference value between the second power and the maximum transmission power of the UE and the second power margin is greater than 0, the base station may instruct, in the indication information, to transmit the data with the first priority on resources which have been occupied by data with a second priority. As another example, if the power margin comprises the second power margin indicating the second difference value between the second power and the maximum transmission power of the UE and the second power margin is less than 0, or if the power margin comprises the first power margin indicating the difference value between the first power and the maximum transmission power of the UE and the first power margin is greater than 0, the base station may instruct, in the indication information, to transmit the data with the first priority on the idle resources.

Figure 3:
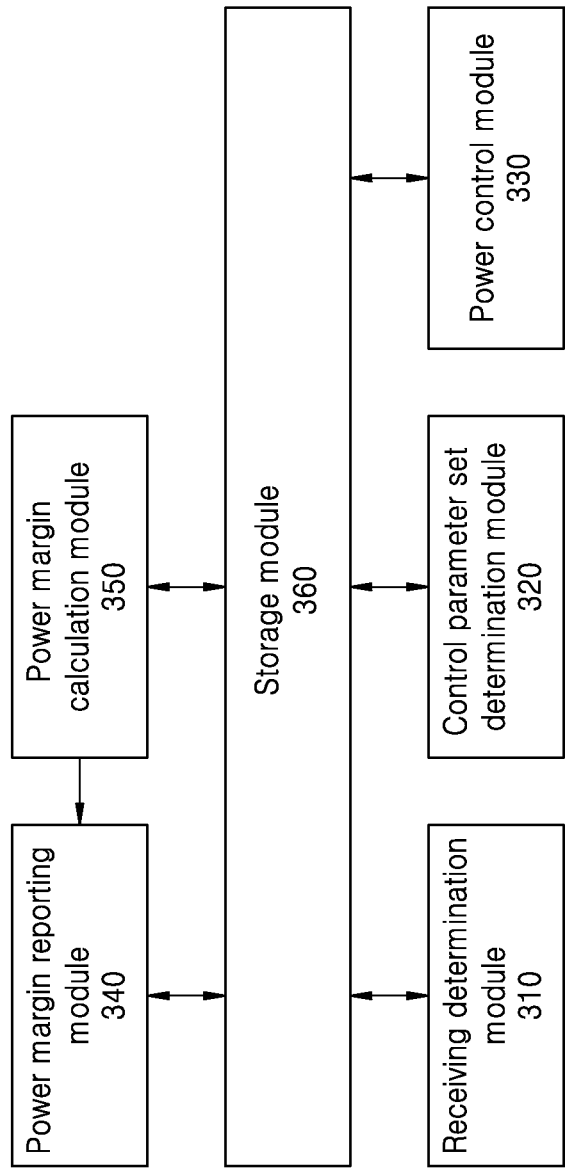
FIG. 3 illustrates a schematic block diagram of a User Equipment (UE) according to an exemplary embodiment.

FIG. 3 illustrates a schematic block diagram of a User Equipment (UE) according to an exemplary embodiment. FIG. 3 illustrates a schematic block diagram of a user equipment according to an embodiment of the present application.

As shown in FIG. 3, the user equipment comprises a receiving determination module 310, a control parameter set determination module 320, and a power control module 330.

The receiving determination module 310 is configured to determine whether indication information is received from a base station.

The control parameter set determination module 320 is configured to determine a power control parameter set for transmitting data with a first priority based on whether the indication information is received.

The power control module 330 is configured to control a transmission power of a channel for transmitting the data with the first priority based on the determined power control parameter set.

In some embodiments, the control parameter set determination module 320 may be configured to determine whether the data with the first priority is transmitted on idle resources or on resources which have been occupied by data with a second priority based on the indication information, if the indication information is received.

In an embodiment, the control parameter set determination module 320 may be configured to determine that the power control parameter set is a first power control parameter set for setting a first power, if the data with the first priority is transmitted on the idle resources.

In an embodiment, the control parameter set determination module 320 may be configured to determine that the power control parameter set is a second power control parameter set for setting a second power, wherein the second power is greater than the first power, if the data with the first priority is transmitted on the resources which have been occupied by the data with the second priority.

In an embodiment, a priority of the transmission of the data with the first priority is higher than that of the transmission of the data with the second priority.

In an embodiment, the control parameter set determination module 320 may be configured to determine, by default, that the data with the first priority is transmitted on the resources which have been occupied by the data with the second priority, if the indication information is not received. In an embodiment, the control parameter set determination module 320 may be configured to select a corresponding power control parameter set based on the default determination.

In some embodiments, the UE may further comprise a power margin reporting module 340 configured to report a transmission power margin to the base station, wherein the indication information is generated by the base station based on the reported power margin.

In some embodiments, the user equipment may further comprise a power margin calculation module 350 configured to calculate a difference value between the first power and a maximum transmission power of the UE as a first power margin; and/or calculate a second difference value between the second power and the maximum transmission power of the UE as a second power margin.

The power margin reporting module 340 may be configured to report the first power margin to the base station, when the first power margin is less than 0 and the second power margin is less than 0 The power margin reporting module 340 may be configured to report the second power margin to the base station, when the first power margin is greater than 0 and the second power margin is greater than 0. The power margin reporting module 340 may be configured to report the first power margin or the second power margin to the base station, when the first power margin is greater than 0 and the second power margin is less than 0.

In some embodiments, the power margin reporting module 340 may be configured to, when the first power margin is less than a first threshold value and/or the second power margin is less than a second threshold value, trigger the reporting of the power margin to the base station.

The user equipment may further comprise a storage module 360 configured to store data and instructions required and/or generated by the respective modules when the modules perform respective functions thereof.

Figure 4:
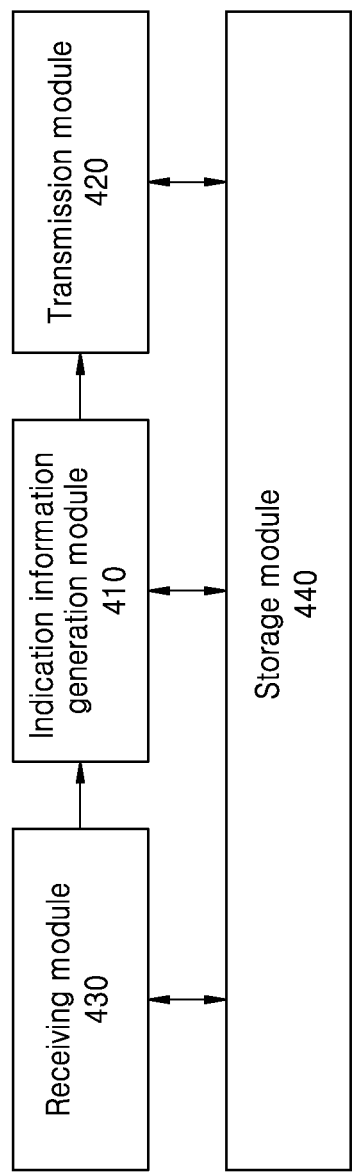
FIG. 4 illustrates a schematic block diagram of a base station according to an exemplary embodiment.

FIG. 4 illustrates a schematic block diagram of a base station according to an exemplary embodiment. FIG. 4 illustrates a schematic block diagram of a base station according to an embodiment of the present application.

As shown in FIG. 4, the base station comprises an indication information generation module 410 and a transmission module 420.

The indication information generation module 410 is configured to generate indication information related to a power control parameter set of a channel for transmitting data with a first priority.

The transmission module 420 is configured to transmit the indication information to the UE.

In some embodiments, the base station may further comprise a receiving module 430 configured to receive a power margin report from the UE.

The indication information generation module 410 may be configured to generate the indication information based on the received power margin report.

In some embodiments, the power control parameter set may comprise a first power control parameter set for setting a first power and a second power control parameter set for setting a second power, wherein the second power is greater than the first power.

In one embodiment, the indication information generation module 410 may be configured to, if the power margin comprises a first power margin indicating a difference value between the first power and a maximum transmission power of the UE and the first power margin is less than 0, indicate, in the indication information, scheduling parameters for adjusting the channel for transmitting the data with the first priority, and instruct to transmit the data with the first priority on idle resources.

In one embodiment, the indication information generation module 410 may be configured to, if the power margin comprises a second power margin indicating a second difference value between the second power and the maximum transmission power of the UE and the second power margin is greater than 0, instruct, in the indication information, to transmit the data with the first priority on resources which have been occupied by data with a second priority.

In one embodiment, the indication information generation module 410 may be configured to, if the power margin comprises the second power margin indicating the second difference value between the second power and the maximum transmission power of the UE and the second power margin is less than 0, or if the power margin comprises the first power margin indicating the difference value between the first power and the maximum transmission power of the UE and the first power margin is greater than 0, instruct, in the indication information, to transmit the data with the first priority on the idle resources.

The base station may further comprise a storage module 440 configured to store data and instructions required and/or generated by the respective modules when the modules perform respective functions thereof.

Figure 5:
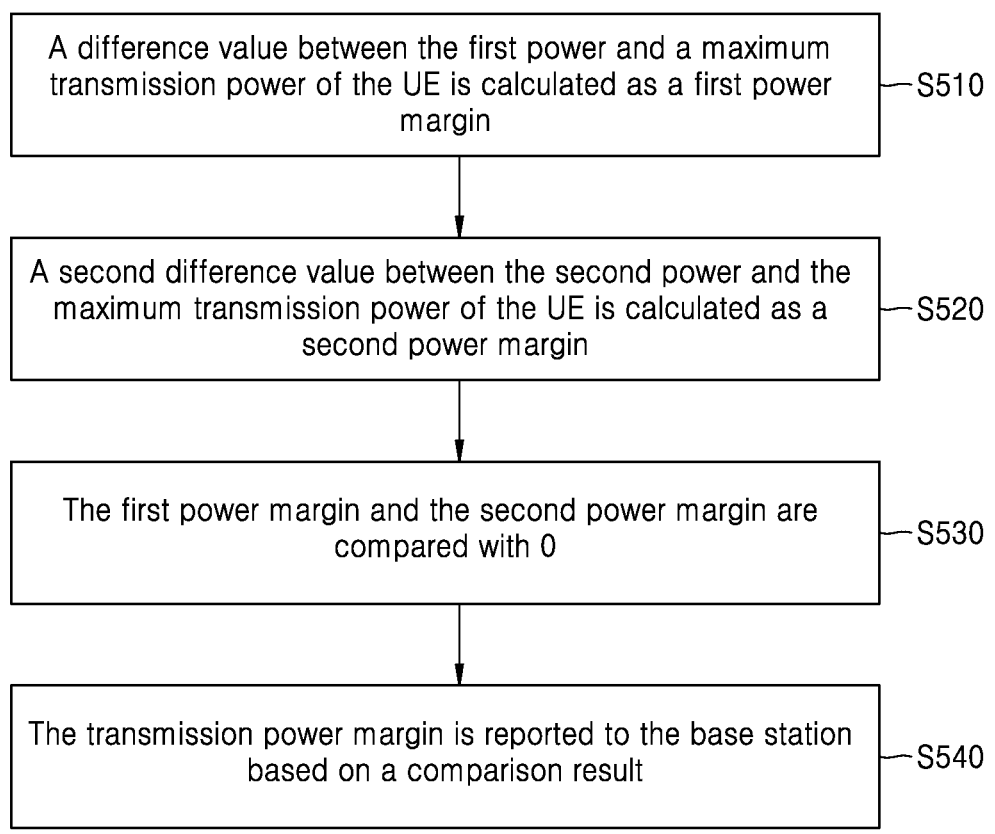
FIG. 5 illustrates a schematic flowchart of a method for reporting a transmission power margin of a User Equipment (UE) according to an exemplary embodiment.

FIG. 5 illustrates a schematic flowchart of a method for reporting a transmission power margin of a User Equipment (UE) according to an exemplary embodiment. FIG. 5 illustrates a schematic flowchart of a method for reporting a transmission power margin of a User Equipment (UE) according to an embodiment of the present application.

A power control parameter set of the UE comprises a first power control parameter set for setting a first power and a second power control parameter set for setting a second power, wherein the second power is greater than the first power. As shown in FIG. 5, the method comprises the following steps.

In step S510, a difference value between the first power and a maximum transmission power of the UE is calculated as a first power margin, by the UE.

In step S520, a second difference value between the second power and the maximum transmission power of the UE is calculated as a second power margin, by the UE.

In step S530, the first power margin and the second power margin are compared with 0, by the UE.

In step S540, the transmission power margin is reported to the base station based on a comparison result, by the UE.

In some embodiments, the UE may report the transmission power margin to the base station based on a comparison result may comprise at least one of:

When the first power margin is less than 0 and the second power margin is less than 0, the UE may report the first power margin to the base station; when the first power margin is greater than 0 and the second power margin is greater than 0, the UE may report the second power margin to the base station; Or when the first power margin is greater than 0 and the second power margin is less than 0, the UE may report the first power margin or the second power margin to the base station.

In some embodiments, the UE may compare the first power margin with a first threshold value and/or compare the second power margin with a second threshold value. When the first power margin is less than the first threshold value and/or the second power margin is less than the second threshold value, the UE may trigger the reporting of the power margin to the base station.

Figure 6:
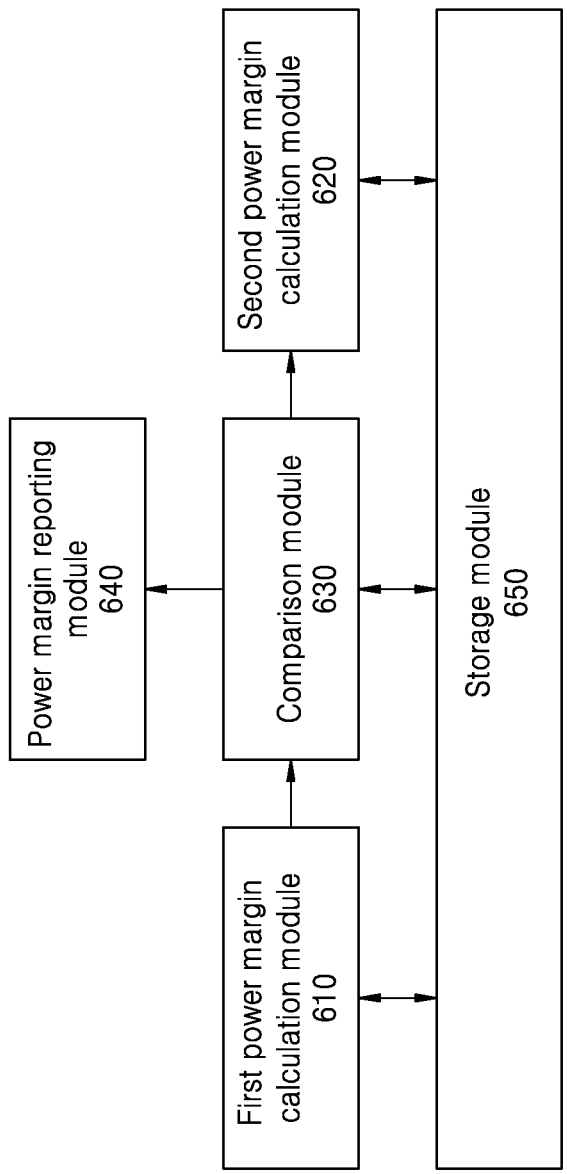
FIG. 6 illustrates a schematic block diagram of another User Equipment (UE) according to an exemplary embodiment.

FIG. 6 illustrates a schematic block diagram of another User Equipment (UE) according to an exemplary embodiment. FIG. 6 illustrates a schematic block diagram of a User Equipment (UE) according to an embodiment of the present application.

A power control parameter set of the UE comprises a first power control parameter set for setting a first power and a second power control parameter set for setting a second power, wherein the second power is greater than the first power.

As shown in FIG. 6, the UE comprises a first power margin calculation module 610, a second power margin calculation module 620, a comparison module 630, and a power margin reporting module 640.

The first power margin calculation module 610 is configured to calculate a difference value between the first power and a maximum transmission power of the UE as a first power margin.

The second power margin calculation module 620 is configured to calculate a second difference value between the second power and the maximum transmission power of the UE as a second power margin.

The comparison module 630 is configured to compare the first power margin and the second power margin with 0.

The power margin reporting module 640 is configured to report a transmission power margin to the base station based on a comparison result.

In some embodiments, the power margin reporting module 640 may be configured to perform one of the following operations. When the first power margin is less than 0 and the second power margin is less than 0, the power margin reporting module 640 may be configured to report the first power margin to the base station. When the first power margin is greater than 0 and the second power margin is greater than 0, the power margin reporting module 640 may be configured to report the second power margin to the base station. When the first power margin is greater than 0 and the second power margin is less than 0, the power margin reporting module 640 may be configured to report the first power margin or the second power margin to the base station.

In some embodiments, the comparison module 630 may further be configured to compare the first power margin with a first threshold value and/or compare the second power margin with a second threshold value.

The power margin reporting module 640 may further be configured to, when the first power margin is less than the first threshold value and/or the second power margin is less than the second threshold value, trigger the reporting of the power margin to the base station.

The user equipment may further comprise a storage module 650 configured to store data and instructions required and/or generated by the respective modules when the modules perform respective functions thereof.

The technical solutions according to the present application will be described in detail below according to specific examples. It should be appreciated that the following specific implementations are merely examples for implementing the technical solutions according to the present application, and should not be construed as limiting the technical solutions according to the present application. In addition, although the technical solutions described below are mainly described for an LTE system, application scenarios thereof are not limited to the LTE communication system, but may be applied to any other system involving services with different priorities.

It should be illustrated that, the figures shown in the accompanying drawings are merely schematic diagrams provided to facilitate understanding of the technical solutions according to the present application. The technical solutions according to the present application are not limited by steps and/or structures shown in the accompanying drawings.

Figure 7:
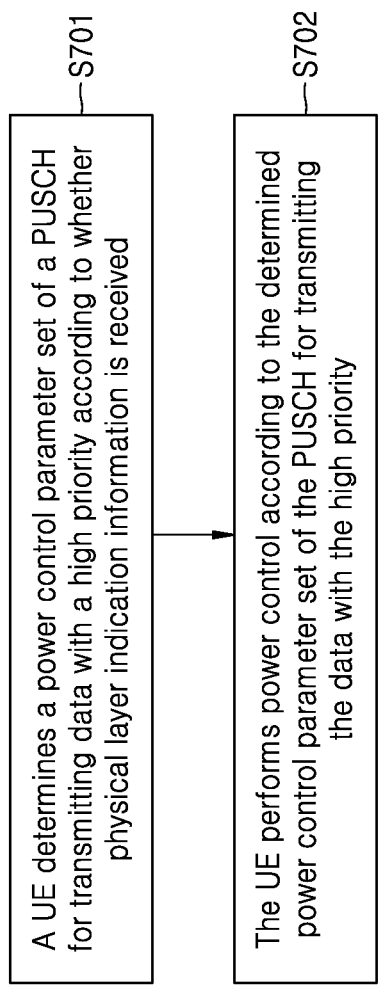
FIG. 7 illustrates a schematic flowchart of another method for power control according to an exemplary embodiment.

FIG. 7 illustrates a schematic flowchart of another method for power control according to an exemplary embodiment.

In order to achieve the purpose of the present application, the embodiments of the present application propose a method for power control. As shown in FIG. 7, the method comprises the following steps.

In step S701, a UE determines a power control parameter set of a PUSCH for transmitting data with a high priority according to whether physical layer indication information is received.

In step S702, the UE performs power control according to the determined power control parameter set of the PUSCH for transmitting the data with the high priority.

The indication information in step S701 may be group-common DCI indication information of the PUSCH indicating which resources have been scheduled to transmit data with a low priority (for example, eMBB data), or may be DCI indication information indicating a power control set of the PUSCH for transmitting the data with the high priority (for example, URLLC data), or may also be other types of indication information which may be used to determine the power control set of the PUSCH for transmitting the data with the high priority.

The PUSCH for transmitting the data with the high priority in step S701 may be a PUSCH which is not scheduled by the DCI (i.e., a grant-free PUSCH). At least two power control parameter sets are configured for the PUSCH. In the present application, the description is made by taking two power control parameter sets being configured for the PUSCH as an example.

The technical solutions according to the present application will be further described in detail below through preferred embodiments.

First Embodiment

In the present embodiment, a method for power control of a grant-free PUSCH for transmitting data with a high priority is described.

Figure 8:
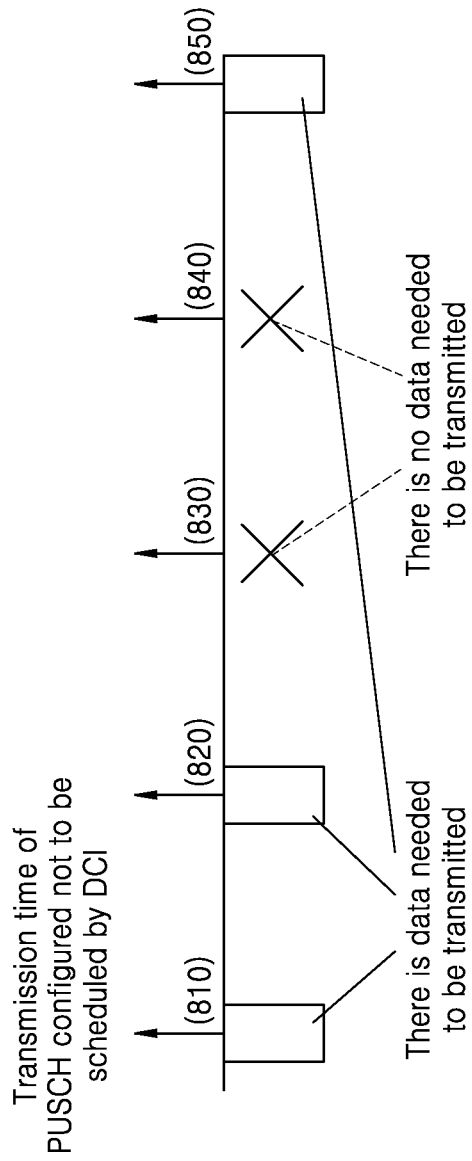
FIG. 8 illustrates a schematic diagram of data transmission occasions at a UE according to an exemplary embodiment.

FIG. 8 illustrates a schematic diagram of data transmission occasions at a UE according to an exemplary embodiment.

In the present embodiment, a problem of sharing transmission resources when data with different priorities is transmitted is described. In order to meet the low-latency requirements for transmission of the data with the high priority, uplink data is transmitted using a grant-free PUSCH. However, the data with the high priority is not required to be transmitted at each occasion at which the grant-free PUSCH is configured to be transmitted.

There may be data transmission or may not be data transmission at each occasion at which the grant-free PUSCH is configured to be transmitted, as shown in FIG. 8. More specifically, referring to FIG. 8, each transmission time 810, 820, 830, 840, 850 may be a transmission time of PUSCH not scheduled by the DCI. Referring to FIG. 8, data may be transmitted using a transmission time of PUSCHs 810, 820, and 850. In addition, there is no data needed to be transmitted at transmission time of PUSCH 830, 840.

The UE does not transmit the PUSCH 830, 840 at an occasion at which there is no data transmission, and resources configured for the transmission of the grant-free PUSCH are idle. In order to make full use of the resources, a best way is to transmit data with a low priority when there is no data with the high priority to be transmitted. In this way, data transmission is performed by making full use of the resources.

Figure 9:
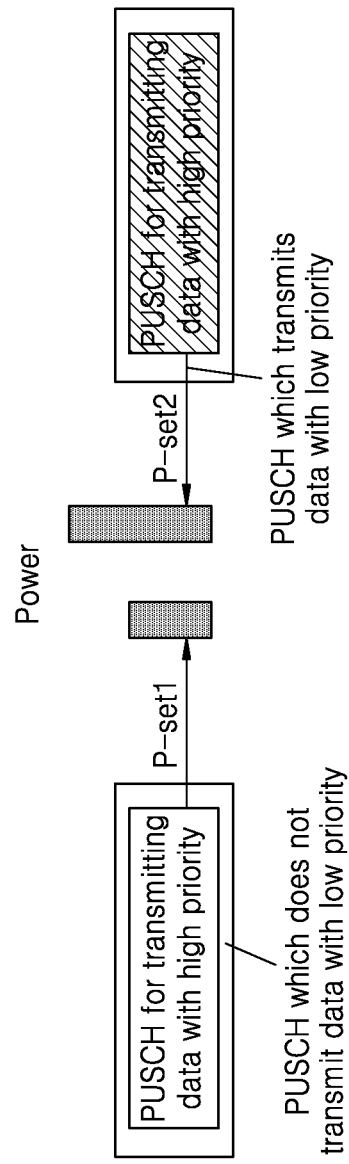
FIG. 9 illustrates a schematic diagram of transmission of data with a high priority using two different transmission powers according to an exemplary embodiment.

FIG. 9 illustrates a schematic diagram of transmission of data with a high priority using two different transmission powers according to an exemplary embodiment.

In one embodiment, P-set1 is a power control parameter set, that the PUSCH is transmitted on the idle resources. More specifically, The P-set1 is used for power control when the PUSCH for transmitting the data with the high priority is transmitted on idle resources.

In one embodiment, P-set2 is a power control parameter set, that that the PUSCH for transmitting the data with the high priority is transmitted on the resources of the PUSCH which have been used to transmit the data with the low priority. More specifically, the P-set2 is used for power control when the PUSCH for transmitting the data with the high priority is transmitted on the resources of the PUSCH which have been used to transmit the data with the low priority.

When the PUSCH for transmitting the data with the high priority is transmitted on idle resources, the PUSCH is subjected to less interference and performance thereof is easily ensured. At this time, a power control parameter set P-set1 may be used for power control of the transmission of the PUSCH. When the PUSCH for transmitting the data with the high priority is transmitted on resources of a PUSCH which have been used to transmit the data with the low priority, the PUSCH is subjected to additional interference which is relatively large, and performance thereof is not easy to be ensured.

In order to obtain the same performance as that when there is no interference from the PUSCH for transmitting the data with the low priority, a transmission power of the PUSCH for transmitting the data with the high priority may be increased at this time to offset the received additional interference. At this time, a power control parameter set P-set2 may be used for power control of the transmission of the PUSCH. Also, a transmission power of the PUSCH which is calculated using the power control parameter set P-set2 is greater than a transmission power of the PUSCH which is calculated using the power control parameter set P-set1, as shown in FIG. 9.

When the data with the high priority is transmitted through the grant-free PUSCH, the PUSCH is not scheduled through DCI. In this case, when the UE wants to transmit the data with the high priority through the grant-free PUSCH, there is a problem of how to enable the UE to know whether the PUSCH is transmitted on idle resources or on resources of a PUSCH which have been used to transmit the data with the low priority.

One method is that the UE may determine whether the PUSCH is transmitted on idle resources or on resources of a PUSCH which have been used to transmit the data with the low priority by receiving indication information in DCI. Then UE may perform power control on the PUSCH using a corresponding power control parameter set according to the determination on whether the PUSCH is transmitted on the idle resources or on the resources of the PUSCH which have been used to transmit the data with the low priority.

If the UE receives the indication information, the UE may determine whether the PUSCH is transmitted on the idle resources or on the resources of the PUSCH which have been used to transmit the data with the low priority according to the indication of the indication information. Then UE may perform power control on the PUSCH using a corresponding power control parameter set according to the determination on whether the PUSCH is transmitted on the idle resources or on the resources of the PUSCH which have been used to transmit the data with the low priority, so that the reliability of the transmission of the data with the high priority may be ensured without wasting power.

If the UE does not receive the indication information (for example, the UE misses the indication information), the UE may not determine whether the PUSCH is transmitted on the idle resources or on the resources of the PUSCH which have been used to transmit the data with the low priority.

In one embodiment, If the UE assumes that the PUSCH for transmitting the data with the high priority is transmitted on the idle resources, the UE then performs power control on the PUSCH using a corresponding power control parameter set (for example, P-set1) according to the determination that the PUSCH is transmitted on the idle resources. However, if the PUSCH for transmitting the data with the high priority is actually transmitted on the resources of the PUSCH which have been used to transmit the data with the low priority, the performance of the PUSCH for transmitting the data with the high priority may not be ensured, which is a relatively serious problem.

In another embodiment, If the UE assumes that the PUSCH for transmitting the data with the high priority is transmitted on the resources of the PUSCH which have been used to transmit the data with the low priority, the UE then performs power control on the PUSCH using a corresponding power control parameter set (for example, P-set2) according to the determination that the PUSCH for transmitting the data with the high priority is transmitted on the resources of the PUSCH which have been used to transmit the data with the low priority. However, if the PUSCH for transmitting the data with the high priority is actually transmitted on the idle resources, the performance of the PUSCH for transmitting the data with the high priority may not be ensured, which may result in a waste of power to a certain extent.

it is very important to ensure the performance of the PUSCH for transmitting the data with the high priority. So, if the UE does not receive this indication information, and thus the UE may not determine whether the PUSCH is transmitted on the idle resources or on the resources of the PUSCH which have been used to transmit the data with the low priority. The UE assumes that the PUSCH for transmitting the data with the high priority is transmitted on the resources of the PUSCH which have been used to transmit the data with the low priority, then the UE performs power control on the PUSCH using a corresponding power control parameter set according to the determination that the PUSCH is transmitted on the resources of the PUSCH which have been used to transmit the data with the low priority.

For example, the base station configures the UE with two power control parameter sets of the PUSCH for transmitting the data with the high priority, which are P-set1 and P-set2 respectively. The P-set1 is used for power control when the PUSCH for transmitting the data with the high priority is transmitted on idle resources, and the P-set2 is used for power control when the PUSCH for transmitting the data with the high priority is transmitted on the resources of the PUSCH which have been used to transmit the data with the low priority.

If the UE does not receive the indication information, and thus the UE may not determine whether the PUSCH is transmitted on the idle resources or on the resources of a PUSCH which have been used to transmit the data with the low priority. In this case, the UE performs power control on the PUSCH according to the power control parameter set P-set2 for a case where the PUSCH is transmitted on the resources of the PUSCH which have been used to transmit the data with the low priority. Because the power of the PUSCH which is calculated using the power control parameter set P-set2 is greater than the power of the PUSCH which is calculated using the power control parameter set P-set1.

At this time, the performance of the PUSCH for transmitting the data with the high priority may be ensured no matter whether the PUSCH for transmitting the data with the high priority is transmitted on the resources of the PUSCH which have been used to transmit the data with the low priority or on the idle resources.

In another embodiment, if the UE does not receive the indication information, the UE considers that the base station does not transmit the indication information, that is, all PUSCHs for transmitting the data with the high priority are transmitted on the idle resources. At this time, the UE performs power control on the PUSCH according to the power control parameter set P-set1 for a case where the PUSCH is transmitted on the idle resources, which may reduce the interference to neighboring cells due to a power for the transmission of the PUSCH by the UE while saving signaling for transmitting the indication information.

In another embodiment, if the UE does not receive the indication information, the UE performs power control on the PUSCH using a power control parameter set determined by high-level signaling configuration (the power control parameter set is referred to as a default power control parameter set).

Alternatively, the PUSCH for transmitting the data with the high priority may be a PUSCH which is not scheduled by DCI (i.e., a grant-free PUSCH). At least two power control parameter sets are configured for the PUSCH. In the present application, the description is made by taking two power control parameter sets being configured for the PUSCH as an example.

One method is that the UE may determine whether power control is performed on the PUSCH using a first power control parameter set (for example, P-set1) or a second power control parameter set (for example, P-set2) by receiving indication information in DCI (for example, group-common DCI, or UE-specific DCI, wherein the indication information is referred to as power control indication information), and it is assumed that a power control value which is obtained through the first power control parameter set is greater than that which is obtained through the second power control parameter set. In addition, the power control indication information has an applicable range. For example, the power control indication information received at a time unit n is applied within a time range from a time unit n+k to a time unit n+k+L (wherein k and L are preset by a protocol or determined by high-level signaling).

In one embodiment, If the UE receives the indication information, the UE may determine whether power control is performed on the PUSCH in a corresponding range using the first power control parameter set or the second power control parameter set according to the indication of the indication information, which may ensure the reliability of the transmission of the data with the high priority without wasting power.

In one embodiment, If the UE does not receive the indication information (for example, the UE misses the indication information), the UE may not determine whether power control is performed on the PUSCH in a corresponding range using the first power control parameter set or the second power control parameter set.

The UE assumes that power control needs to be performed on the PUSCH for transmitting the data with the high priority using the first power control parameter set (for example, the P-set1). that is, the PUSCH for transmitting the data with the high priority is transmitted using a high power. But the UE does not know that power control needs to be performed on the PUSCH for transmitting the data with the high priority using the high power and the UE performs power control on the PUSCH using the second power control parameter set (for example, the P-set2). In this case, the performance of the PUSCH for transmitting the data with the high priority may not be ensured, which is a relatively serious problem.

The UE may assume that power control needs to be performed on the PUSCH for transmitting the data with the high priority using the second power control parameter set (for example, the P-set2), that is, the PUSCH for transmitting the data with the high priority is transmitted using a low power, but the UE does not know that power control needs to be performed on the PUSCH for transmitting the data with the high priority using the low power and The UE performs power control on the PUSCH using the first power control parameter set (for example, the P-set1), the performance of the PUSCH for transmitting the data with the high priority may be ensured, but may result in a waste of power to a certain extent.

Since it is very important to ensure the performance of the PUSCH for transmitting the data with the high priority, if the UE does not receive this indication information, and thus the UE may not determine whether power control is performed on the PUSCH using the first power control parameter set or the second power control parameter set.

In one embodiment, when the UE does not receive this indication information, the UE may assume that power control needs to be performed on the PUSCH for transmitting the data with the high priority using the first power control parameter set (for example, the P-set1). that is, the PUSCH for transmitting the data with the high priority is transmitted using a high power. At this time, no matter whether power control needs to be performed on the PUSCH for transmitting the data with the high priority using the first power control parameter set or the second power control parameter set, the performance may be guaranteed.

In one embodiment, when the UE does not receive the indication information, the UE considers that the base station does not transmit the indication information. At this time, the UE performs power control on the PUSCH according to the second power control parameter set P-set2, which may reduce the interference to neighboring cells due to a power for the transmission of the PUSCH by the UE while saving signaling for transmitting the indication information.

In one embodiment, when the UE does not receive the indication information, the UE performs power control on the PUSCH using a power control parameter set determined by a high-level signaling configuration (the power control parameter set is referred to as a default power control parameter set).

Figure 10:
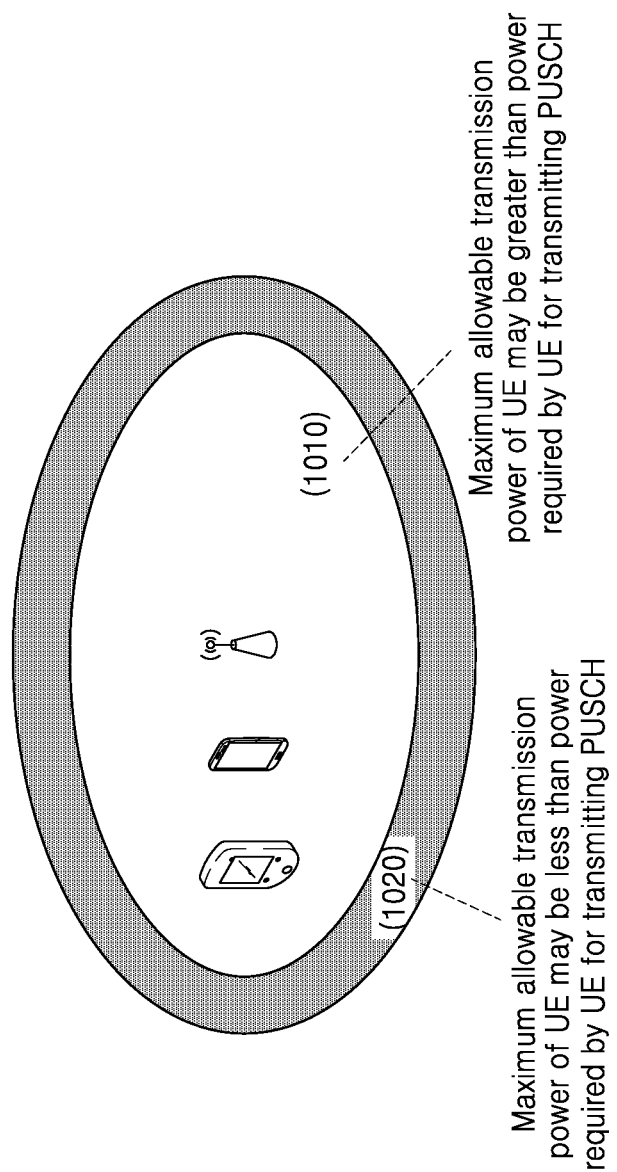
FIG. 10 illustrates a schematic diagram of requirements for transmission powers when a UE is located at different positions in a cell according to an exemplary embodiment.

FIG. 10 illustrates a schematic diagram of requirements for transmission powers when a UE is located at different positions in a cell according to an exemplary embodiment. When the PUSCH for transmitting the data with the high priority is transmitted on the resources of the PUSCH which have been used to transmit the data with the low priority, the power of the PUSCH needs to be additionally increased.

According to FIG. 10, the UE may locate in an area 1010 which is close to the base station. When the UE is relatively close to the base station, a maximum allowed transmission power of the UE is greater than a power required by the UE for the transmission of the PUSCH.

According to FIG. 10, the UE may locate in an area 1020 which is far away from the base station. When the UE is far away from the base station, the maximum allowable transmission power of the UE may be less than the power required by the UE for the transmission of the PUSCH. At this time, the performance of the PUSCH for transmitting the data with the high priority may not be guaranteed, as shown in FIG. 10.

In order to allow the base station to obtain in time whether the maximum transmission power of the UE meets the power required for the transmission of the PUSCH for transmitting the data with the high priority, the UE needs to report a PHR to the base station in time. A method for reporting a PHR of a grant-free PUSCH for transmitting data with a high priority will be described below.

Second Embodiment

In the present embodiment, a method for transmitting a PHR (Power Headroom Report) is described.

A base station configures a UE with two power control parameter sets of a PUSCH for transmitting data with a high priority, which are P-set1 and P-set2 respectively. However, for convenience of description only, the number of power control parameter sets is not limited to two.

In this specification, the P-set1 may mean power control parameter set which may be used for power control when the PUSCH for transmitting the data with the high priority is transmitted on idle resources. In this specification, the P-set2 may mean power control parameter set which may be used for power control when the PUSCH for transmitting the data with the high priority is transmitted on resources of a PUSCH which have been used to transmit data with a low priority. A power of the PUSCH which is calculated using the power control parameter set P-set2 is greater than power of the PUSCH which is calculated using the power control parameter set P-set1.

Further, a state in which the resources of the grant-free PUSCH for transmitting the data with the high priority by the UE are idle or have been used to transmit the data with the low priority is dynamically changed.

When the data with the high priority is transmitted using the grant-free PUSCH, the primary purpose of the base station to obtain a remaining power of the UE through the PHR is not to modify a number of resources of the PUSCH and modify a modulation and coding rate of the transmitted data, but to determine whether the calculated power is less than a maximum transmission power of the UE.

If the calculated power of the UE is less than the maximum transmission power of the UE, scheduling parameters for transmitting the grant-free PUSCH may remain unchanged.

If the calculated power of the UE is greater than the maximum transmission power of the UE, the scheduling parameters for transmitting the grant-free PUSCH may be reconfigured or reactivated. In this case, the calculated power of the UE is less than or equal to the maximum transmission power of the UE, to ensure the performance of the transmission of the data with the high priority.

In order to enable the base station to know information that the power calculated by the UE is greater than the maximum transmission power of the UE in time when the power calculated by the UE is greater than the maximum transmission power of the UE, the PHR is reported using the following method. The UE is configured with two power control parameter sets of the PUSCH for transmitting the data with the high priority, which are P-set1 and P-set2 respectively.

The P-set1 is used for power control when the PUSCH for transmitting the data with the high priority on idle resources, and the P-set2 is used for power control when the PUSCH for transmitting the data with the high priority is transmitted on the resources of the PUSCH which have been used to transmit the data with the low priority. A power of the PUSCH which is calculated using the power control parameter set P-set2 is greater than that of the PUSCH which is calculated using the power control parameter set P-set1.

The UE calculates to obtain two PHRs, which are PHR-1 and PHR-2 respectively. According to the two power control parameter sets respectively, wherein the PHR-1 is calculated according to the P-set1.

PHR-1 may be determined according to Equation 1 below.

$$\text{PHR-1} = \text{maximum transmission power of the UE} - \text{power of the PUSCH calculated according to the } P\text{-set1}, \quad \text{Equation 1}$$

PHR-2 is calculated according to the P-set2.
PHR-2 may be determined according to Equation 2 below.

$$\text{PHR-2} = \text{maximum transmission power of the UE} - \text{power of the PUSCH calculated according to the } P\text{-set2}, \quad \text{Equation 2}$$

The UE then autonomously determines that the reported PHR is one of the PHR-1 and the PHR-2 according to the calculated values of the two PHR-1 and PHR-2.

First Method:

A specific exemplary implementation method is described as follows. In summary, the PHR is reported according to a flowchart shown in FIG. 11.

Figure 11:
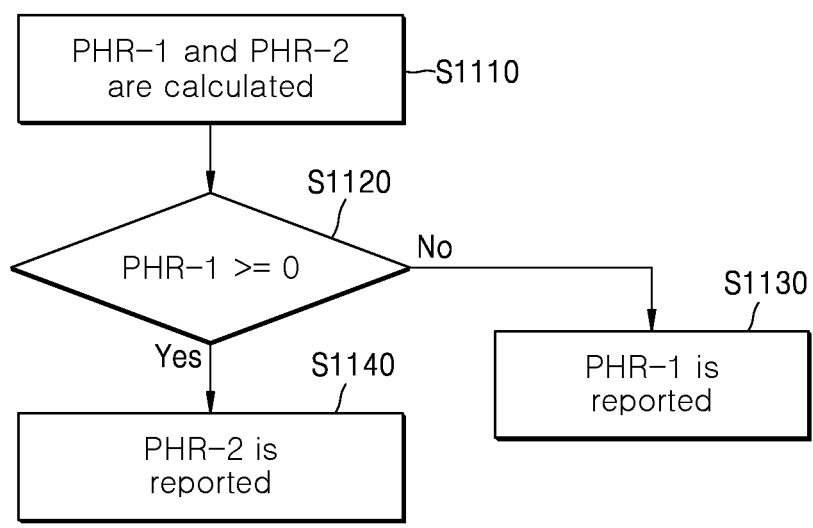
FIG. 11 illustrates a schematic flowchart of a first example of a process of reporting a PHR according to an exemplary embodiment.

FIG. 11 illustrates a schematic flowchart of a first example of a process of reporting a PHR according to an exemplary embodiment.

In step S110, the UE may calculate to obtain two PHRs, which are PHR-1 and PHR-2 respectively.

In step S1120, the UE may determine whether PHR-1 is greater than 0.

In step S1130, the UE may determine PHR-1 is less than 0. In this case, the UE may transmit PHR-1 to baseband. When the UE reports the PHR-1, the PHR-2 is necessarily less than 0.

When the PHR-1 is less than 0 and the PHR-2 is less than 0, it means that the power of the PUSCH calculated according to the P-set1 is greater than the maximum transmission power of the UE, and the power of the PUSCH calculated using the power control parameter set P-set2 is greater than the power of the PUSCH calculated using the power control parameter set P-set1. Therefore, the power of the PUSCH calculated according to the P-set2 is greater than the maximum transmission power of the UE.

At this time, the UE reports the PHR-1. Then the base station adjusts the scheduling parameters of the PUSCH according to the PHR-1, and schedules the UE on idle resources on which there is no transmission of data with a low priority. The power of the PUSCH for transmitting the data with the high priority is less than or equal to the maximum transmission power of the UE, thereby ensuring the performance of the transmission of the data with the high priority.

In step S1140, the UE may determine PHR-1 is greater than 0. In this case, the UE may transmit PHR-2 to baseband. When the UE reports the PHR-2, the PHR-1 is necessarily greater than 0 no matter whether the PHR-2 is greater than 0 or is less than or equal to 0.

When the PHR-1 is greater than 0 and the PHR-2 is greater than 0, it means that the power of the PUSCH calculated according to the P-set2 is less than the maximum transmission power of the UE, and the power of the PUSCH calculated using the power control parameter set P-set2 is greater than the power of the PUSCH calculated using the power control parameter set P-set1. Therefore, the power of the PUSCH calculated according to the P-set1 is less than the maximum transmission power of the UE. At this time, the UE reports the PHR-2 to enable the base station to know that the UE is close to the base station at this time. The base station may schedule the UE to transmit the PUSCH for transmitting the data with the high priority on resources on which there is transmission of data with a low priority while the performance of the transmission of the data with the high priority is ensured.

When the PHR-1 is greater than 0 and the PHR-2 is less than 0, it means that the power of the PUSCH calculated according to the P-set2 is greater than the maximum transmission power of the UE, and the power of the PUSCH calculated according to the P-set1 is less than the maximum transmission power of the UE.

At this time, the UE reports the PHR-2 to enable the base station to know that the UE is far away from the base station at this time. If the scheduling parameters of the PUSCH are not adjusted, the UE may not transmit the PUSCH for transmitting the data with the high priority on the resources of the PUSCH on which there is transmission of data with a low priority. If the performance of the transmission is not ensured but there is an assumption that the PHR-1 is greater than 0 when the PHR-2 is reported, the UE may still transmit the PUSCH for transmitting the data with the high priority on the idle resources of the PUSCH which have not been used to transmit the data with the low priority.

In summary, the PHR is reported according to a flowchart shown in FIG. 11.

Second Method:

Another specific exemplary implementation method is described as follows. In summary, the PHR is reported according to a flowchart shown in FIG. 12.

Figure 12:
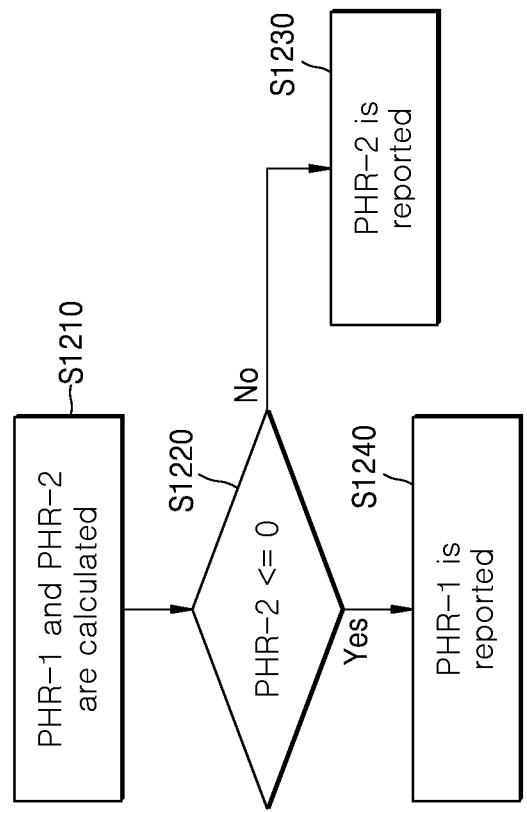
FIG. 12 illustrates a schematic flowchart of a second example of a process of reporting a PHR according to an exemplary embodiment.

FIG. 12 illustrates a schematic flowchart of a second example of a process of reporting a PHR according to an exemplary embodiment.

In step S1210, the UE may calculate to obtain two PHRs, which are PHR-1 and PHR-2 respectively.

In step S1220, the UE may determine whether PHR-2 is less than 0.

In step S1230, the UE may determine PHR-2 is greater than 0. In this case, the UE may transmit PHR-2 to base station.

When the PHR-1 is greater than 0 and the PHR-2 is greater than 0, it means that the power of the PUSCH calculated according to the P-set2 is less than the maximum transmission power of the UE, and the power of the PUSCH calculated using the power control parameter set P-set2 is greater than the power of the PUSCH calculated using the power control parameter set P-set1. Therefore, the power of the PUSCH calculated according to the P-set1 is less than the maximum transmission power of the UE. At this time, the UE reports the PHR-2 to enable the base station to know that the UE is close to the base station at this time. The base station may schedule the UE to transmit the PUSCH for transmitting the data with the high priority on resources on which there is transmission of data with a low priority while the performance of the transmission of the data with the high priority is ensured.

In step S1240, the UE may determine PHR-2 is less than 0. In this case, the UE may transmit PHR-1 to baseband.

When the PHR-1 is less than 0 and the PHR-2 is less than 0, it means that the power of the PUSCH calculated according to the P-set1 is greater than the maximum transmission power of the UE, and the power of the PUSCH calculated using the power control parameter set P-set2 is greater than the power of the PUSCH calculated using the power control parameter set P-set1. Therefore, the power of the PUSCH calculated according to the P-set2 is greater than the maximum transmission power of the UE.

At this time, the UE may report the PHR-1. Then the base station may adjust the scheduling parameters of the PUSCH according to the PHR-1, and schedule the UE on idle resources on which there is no transmission of data with a low priority. The power of the PUSCH for transmitting the data with the high priority is less than or equal to the maximum transmission power of the UE, thereby ensuring the performance of the transmission of the data with the high priority.

When the PHR-1 is greater than 0 and the PHR-2 is less than 0, it means that the power of the PUSCH calculated according to the P-set2 is greater than the maximum transmission power of the UE, and the power of the PUSCH calculated according to the P-set1 is less than the maximum transmission power of the UE.

At this time, the UE reports the PHR-1 to enable the base station to know that the UE is far away from the base station at this time. The UE may transmit the PUSCH for transmitting the data with the high priority on the idle resources of the PUSCH which have not been used to transmit the data with the low priority. However, if there is an assumption that the PHR-2 is less than 0 when the PHR-1 is reported, the UE may not transmit the PUSCH for transmitting the data with the high priority on the resources of the PUSCH on which there is transmission of data with a low priority.

In summary, the PHR is reported according to a flowchart shown in FIG. 12.

It should be illustrated that based on the disclosure of the present application, there may be other rules or methods for reporting or informing a transmission power margin based on the values of the PHR-1 and the PHR-2, and the present application is not limited to the manner shown in FIG. 11 or FIG. 12. The other rules or methods should be included within the scope of the present application.

FIG. 13 illustrates a schematic structural diagram of a data packet used for reporting a PHR according to an exemplary embodiment. When the UE autonomously determines that the reported PHR is one of the PHR-1 and the PHR-2, if only the PHR is reported, the base station does not know whether the reported PHR is the PHR-1 or the PHR-2. Therefore, PHR indication information is reported along with the reported PHR to explicitly indicate whether the reported PHR is the PHR-1 or the PHR-2.

For example, the PHR indication information has 1 bit with a bit value of "1" indicating that the PHR-1 is reported or a bit value of "0" indicating that the PHR-2 is reported.

When the PHR is calculated according to the grant-free PUSCH, the UE always reports a real PHR instead of a virtual PHR, and 1-bit information for indicating whether the PHR is the real PHR or the virtual PHR may be reinterpreted as the PHR indication information indicating whether the PHR is the PHR-1 or the PHR-2, as shown in FIG. 13 as a field V which is used as the PHR indication information.

Third Embodiment

Figure 14:
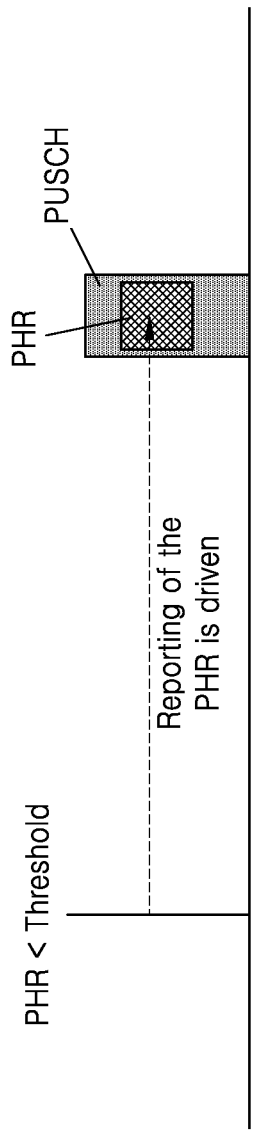
FIG. 14 illustrates a schematic diagram of a manner in which reporting of a PHR is triggered according to an exemplary embodiment.

FIG. 14 illustrates a schematic diagram of a manner in which reporting of a PHR is triggered according to an exemplary embodiment. When a UE transmits data with low-latency requirements, if a power required by a PUSCH for transmitting data with a high priority is greater than a maximum transmission power of the UE, the performance of the transmission of the data with the high priority may not be ensured. Therefore it is necessary to report a power margin in time through a PHR.

Currently, the PHR determines an occasion at which the PHR is reported according to a timer.

If the timer has a large value, and the power required by the PUSCH for transmitting the data with the high priority is greater than the maximum transmission power of the UE, the UE may not report the power margin to the base station in time through the PHR. The base station performs scheduling again, so that the power required by the PUSCH for transmitting the data with the high priority is less than or equal to the maximum transmission power of the UE.

If the timer has a relatively small value, it may waste resources for reporting the PHR.

As shown in FIG. 14, Event-driven PHR reporting may be introduced. The power margin may be reported to the base station in time through the PHR. The base station may perform scheduling again, so that the power required by the PUSCH for transmitting the data with the high priority is less than or equal to the maximum transmission power of the UE, thereby ensuring the reliability and timeliness of the data with the high priority. As shown in FIG. 14, the UE may report a corresponding PHR for the most recent active PUSCH when the calculated PHR is less than a threshold value.

A specific event-driven method may comprise: when the calculated PHR is less than a threshold value, reporting, by the UE, a corresponding PHR for the most recent active PUSCH, as shown in FIG. 14.

The UE is configured with two power control parameter sets of a PUSCH for transmitting data with a high priority, which are P-set1 and P-set2 respectively. The P-set1 is used for power control when the PUSCH for transmitting the data with the high priority is transmitted on idle resources, and the P-set2 is used for power control when the PUSCH for transmitting the data with the high priority is transmitted on the resources of the PUSCH which have been used to transmit the data with the low priority. A power of the PUSCH which is calculated using the power control parameter set P-set2 is greater than that of the PUSCH which is calculated using the power control parameter set P-set1. The UE calculates to obtain two PHRs, which are PHR-1 and PHR-2 respectively, according to the two power control parameter sets respectively, wherein the PHR-1 is calculated according to the P-set1, and the PHR-2 is calculated according to the P-set2. There are several methods for driving a PHR as follows.

First Method:

An event-driven PHR method is that when PHR-1<threshold-1 and PHR-2<threshold-2, a PHR is reported, wherein the threshold-1 and the threshold-2 may be the same or different. With this method, not only the performance of the transmission of the PUSCH for transmitting the data with the high priority on idle resources may be ensured, but also the performance of the transmission of the PUSCH for transmitting the data with the high priority on resources of a PUSCH which have been used to transmit data with a low priority may be ensured, but some resources may need to be occupied to transmit the PHR.

Second Method:

Another event-driven PHR method is that when one of the PHR-1 and the PHR-2 is less than a threshold, a PHR is reported. For example, it may be determined whether to report the PHR using a PHR calculated using a power control parameter set which is currently being used to transmit the PUSCH.

If the PUSCH for transmitting the data with the high priority is transmitted currently using a power control parameter set P-set1, when PHR-1<threshold-1, the PHR is reported, and if the PUSCH for transmitting the data with the high priority is transmitted currently using a power control parameter set P-set2, when PHR-2<threshold-2, the PHR is reported.

If the PUSCH for transmitting the data with the high priority is not transmitted currently, it is determined whether to report the PHR according to a PHR calculated according to a power control parameter set which is recently used to transmit the PUSCH for transmitting the data with the high priority and a corresponding threshold, or it is determined whether to report the PHR according to a certain PHR. If only PHR-2<threshold-2, the PHR is reported. Alternatively, no matter whether the PUSCH for transmitting the data with the high priority is transmitted currently, it is determined whether to report the PHR according to a certain PHR. For example, if only PHR-2<threshold-2, the PHR is reported.

Fourth Embodiment

A PUSCH for transmitting data with a first priority is referred to as a first PUSCH (for example, a PUSCH for transmitting URLLC data), and a PUSCH for transmitting data with a second priority is referred to as a second PUSCH (for example, a PUSCH for transmitting eMBB data).

It is determined whether resources of the second PUSCH overlap with resources of the first PUSCH indicated by UPI information. In this case, the eMBB data is not transmitted on the resources which overlap with the resources of the second PUSCH. It is possible that the resources indicated by the UPI information partially overlap with the resources of the second PUSCH. At this time, there are methods for stopping the transmission of the PUSCH on the resources of the second PUSCH as follows.

If the resources indicated by the UPI information partially overlap with the resources of the second PUSCH, the transmission of the PUSCH on the resources of the second PUSCH is stopped with certain resource granularities in a time domain and a frequency domain.

The resource granularity in the frequency domain may be one or N Physical Resource Blocks (PRBs), or the resource granularity in the frequency domain may be one or M Resource Elements (REs). The resource granularity in the time domain may be one or L slots, or the resource granularity in the time domain may be one or Q OFDM symbols.

Alternatively, the resource granularities in the time domain and the frequency domain are all the time-frequency resources occupied by the PUSCH and all the resources repeated for the PUSCH each time, that is, as long as the resources indicated by the UPI information partially overlap with the resources of the second PUSCH, transmissions of the PUSCH are all stopped.

If the resources indicated by the UPI information partially overlap with the resources of the second PUSCH, in the frequency domain, transmission on some of the resources of the PUSCH is stopped. In order to keep the power of the entire PUSCH consistent in time, a power on the stopped resources may be transferred to frequency resources on which transmission is not stopped, to enable a power of OFDM symbols on which transmission on some of the resources in the frequency domain is stopped to be the same as a power of OFDM symbols on which transmission on all the resources in the frequency domain is not stopped.

For example, a second PUSCH contains four PRBs, a power of each PRB is P1, and two of the four PRBs overlap with resources indicated by UPI information. Transmission on the two PRBs is stopped, and transmission of the PUSCH on remaining two PRBs continues. A power on the two stopped PRBs is transferred to the two PRBs which are not stopped, and a power of each of the remaining two PRBs for the PUSCH is 2*P1.

If the resources indicated by the UPI information partially overlap with the resources of the second PUSCH, and the resources indicated by the UPI information overlap with Demodulation Reference Signals (DMRSs) of the PUSCH in the resources of the second PUSCH, the following methods are used.

First Method:

The demodulation reference signal of the PUSCH in the resources of the PUSCH is moved in the time domain, so that the resources indicated by the UPI information do not overlap with the demodulation reference signal of the PUSCH in the resources of the second PUSCH. If the demodulation reference signal of the PUSCH in the resources of the PUSCH may not be moved in the time domain to enable the resources indicated by the UPI information not to overlap with the demodulation reference signal of the PUSCH in the resources of the second PUSCH, the transmission of the PUSCH in the resources of the second PUSCH is stopped.

Second Method:

The base station implements a method, so that when the PUSCH of the data with the first priority is scheduled, the PUSCH of the data with the first priority may not overlap with the demodulation reference signal of the PUSCH in the resources of the second PUSCH.

Third Method:

If the resources indicated by the UPI information overlap with a part of DMRSs of the PUSCH in the resources of the second PUSCH and do not overlap with another part of the DMRSs of the PUSCH in the resources of the second PUSCH, the UE transmits the non-overlapping DMRSs.

Fourth Method:

If the resources indicated by the UPI information overlap with the DMRSs of the PUSCH in the resources of the second PUSCH, the transmission of the second PUSCH is stopped.

Figure 15:
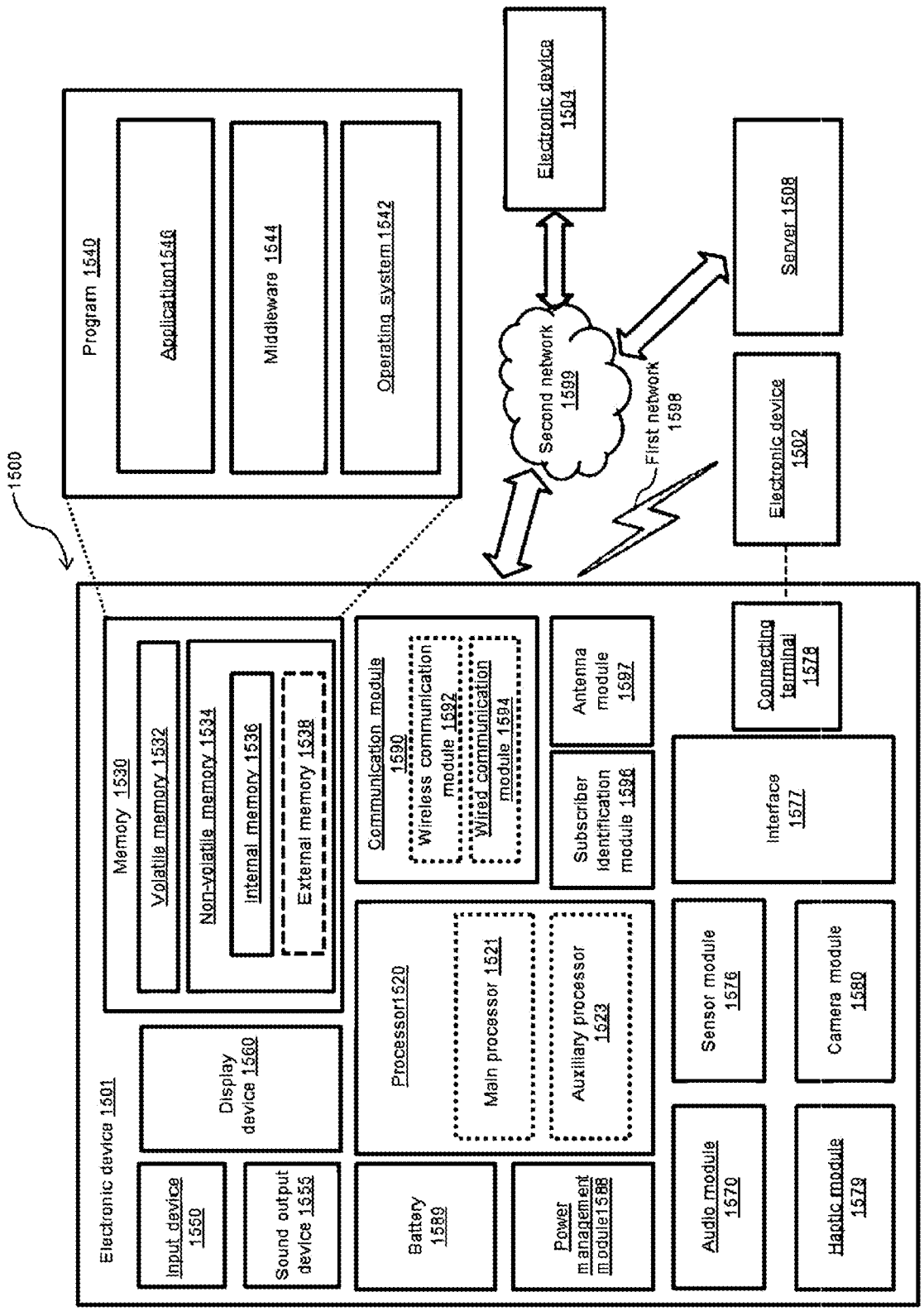
FIG. 15 illustrates a block diagram of an electronic apparatus 1501 in a network environment 1500 according to an exemplary embodiment.

FIG. 15 illustrates a block diagram illustrating an electronic apparatus 1501 in a network environment 1500 according to an exemplary embodiment. The electronic device 1501 may be the UE shown in FIG. 3. Referring to FIG. 15, the electronic device 1501 in the network environment 1500 may communicate with an electronic device 1502 via a first network 1598 (e.g., a short-range wireless communication network), or an electronic device 1504 or a server 1508 via a second network 1599 (e.g., a long-range wireless communication network). According to an embodiment, the electronic device 1501 may communicate with the electronic device 1504 via the server 1508. According to an embodiment, the electronic device 1501 may include a processor 1520, memory 1530, an input device 1550, a sound output device 1555, a display device 1560, an audio module 1570, a sensor module 1576, an interface 1577, a haptic module 1579, a camera module 1580, a power management module 1588, a battery 1589, a communication module 1590, a subscriber identification module (SIM) 1596, or an antenna module 1597. In some embodiments, at least one (e.g., the display device 1560 or the camera module 1580) of the components may be omitted from the electronic device 1501, or one or more other components may be added in the electronic device 1501. In some embodiments, some of the components may be implemented as single integrated circuitry. For example, the sensor module 1576 (e.g., a fingerprint sensor, an iris sensor, or an illuminance sensor) may be implemented as embedded in the display device 1560 (e.g., a display).

The processor 1520 may execute, for example, software (e.g., a program 1540) to control at least one other component (e.g., a hardware or software component) of the electronic device 1501 coupled with the processor 1520, and may perform various data processing or computation. According to one embodiment, as at least part of the data processing or computation, the processor 1520 may load a command or data received from another component (e.g., the sensor module 1576 or the communication module 1590) in volatile memory 1532, process the command or the data stored in the volatile memory 1532, and store resulting data in non-volatile memory 1534. According to an embodiment, the processor 1520 may include a main processor 1521 (e.g., a central processing unit (CPU) or an application processor (AP)), and an auxiliary processor 1523 (e.g., a graphics processing unit (GPU), an image signal processor (ISP), a sensor hub processor, or a communication processor (CP)) that is operable independently from, or in conjunction with, the main processor 1521. Additionally or alternatively, the auxiliary processor 1523 may be adapted to consume less power than the main processor 1521, or to be specific to a specified function. The auxiliary processor 1523 may be implemented as separate from, or as part of the main processor 1521.

The auxiliary processor 1523 may control at least some of functions or states related to at least one component (e.g., the display device 1560, the sensor module 1576, or the communication module 1590) among the components of the electronic device 1501, instead of the main processor 1521 while the main processor 1521 is in an inactive (e.g., sleep) state, or together with the main processor 1521 while the main processor 1521 is in an active state (e.g., executing an application). According to an embodiment, the auxiliary processor 1523 (e.g., an image signal processor or a communication processor) may be implemented as part of another component (e.g., the camera module 1580 or the communication module 1590) functionally related to the auxiliary processor 1523.

The memory 1530 may store various data used by at least one component (e.g., the processor 1520 or the sensor module 1576) of the electronic device 1501. The various data may include, for example, software (e.g., the program 1540) and input data or output data for a command related thereto. The memory 1530 may include the volatile memory 1532 or the non-volatile memory 1534.

The program 1540 may be stored in the memory 1530 as software, and may include, for example, an operating system (OS) 1542, middleware 1544, or an application 1546.

The input device 1550 may receive a command or data to be used by other component (e.g., the processor 1520) of the electronic device 1501, from the outside (e.g., a user) of the electronic device 1501. The input device 1550 may include, for example, a microphone, a mouse, a keyboard, or a digital pen (e.g., a stylus pen).

The sound output device 1555 may output sound signals to the outside of the electronic device 1501. The sound output device 1555 may include, for example, a speaker or a receiver. The speaker may be used for general purposes, such as playing multimedia or playing record, and the receiver may be used for an incoming calls. According to an embodiment, the receiver may be implemented as separate from, or as part of the speaker.

The display device 1560 may visually provide information to the outside (e.g., a user) of the electronic device 1501. The display device 1560 may include, for example, a display, a hologram device, or a projector and control circuitry to control a corresponding one of the display, hologram device, and projector. According to an embodiment, the display device 1560 may include touch circuitry adapted to detect a touch, or sensor circuitry (e.g., a pressure sensor) adapted to measure the intensity of force incurred by the touch.

The audio module 1570 may convert a sound into an electrical signal and vice versa. According to an embodiment, the audio module 1570 may obtain the sound via the input device 1550, or output the sound via the sound output device 1555 or a headphone of an external electronic device (e.g., an electronic device 1502) directly (e.g., wiredly) or wirelessly coupled with the electronic device 1501.

The sensor module 1576 may detect an operational state (e.g., power or temperature) of the electronic device 1501 or an environmental state (e.g., a state of a user) external to the electronic device 1501, and then generate an electrical signal or data value corresponding to the detected state. According to an embodiment, the sensor module 1576 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1577 may support one or more specified protocols to be used for the electronic device 1501 to be coupled with the external electronic device (e.g., the electronic device 1502) directly (e.g., wiredly) or wirelessly. According to an embodiment, the interface 1577 may include, for example, a high definition multimedia interface (HDMI), a universal serial bus (USB) interface, a secure digital (SD) card interface, or an audio interface.

A connecting terminal 1578 may include a connector via which the electronic device 1501 may be physically connected with the external electronic device (e.g., the electronic device 1502). According to an embodiment, the connecting terminal 1578 may include, for example, a HDMI connector, a USB connector, a SD card connector, or an audio connector (e.g., a headphone connector).

The haptic module 1579 may convert an electrical signal into a mechanical stimulus (e.g., a vibration or a movement) or electrical stimulus which may be recognized by a user via his tactile sensation or kinesthetic sensation. According to an embodiment, the haptic module 1579 may include, for example, a motor, a piezoelectric element, or an electric stimulator.

The camera module 1580 may capture a still image or moving images. According to an embodiment, the camera module 1580 may include one or more lenses, image sensors, image signal processors, or flashes.

The power management module 1588 may manage power supplied to the electronic device 1501. According to one embodiment, the power management module 1588 may be implemented as at least part of, for example, a power management integrated circuit (PMIC).

The battery 1589 may supply power to at least one component of the electronic device 1501. According to an embodiment, the battery 1589 may include, for example, a primary cell which is not rechargeable, a secondary cell which is rechargeable, or a fuel cell.

The communication module 1590 may support establishing a direct (e.g., wired) communication channel or a wireless communication channel between the electronic device 1501 and the external electronic device (e.g., the electronic device 1502, the electronic device 1504, or the server 1508) and performing communication via the established communication channel. The communication module 1590 may include one or more communication processors that are operable independently from the processor 1520 (e.g., the application processor (AP)) and supports a direct (e.g., wired) communication or a wireless communication. According to an embodiment, the communication module 1590 may include a wireless communication module 1592 (e.g., a cellular communication module, a short-range wireless communication module, or a global navigation satellite system (GNSS) communication module) or a wired communication module 1594 (e.g., a local area network (LAN) communication module or a power line communication (PLC) module). A corresponding one of these communication modules may communicate with the external electronic device via the first network 1598 (e.g., a short-range communication network, such as Bluetooth™, wireless-fidelity (Wi-Fi) direct, or infrared data association (IrDA)) or the second network 1599 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1592 may identify and authenticate the electronic device 1501 in a communication network, such as the first network 1598 or the second network 1599, using subscriber information (e.g., international mobile subscriber identity (IMSI)) stored in the subscriber identification module 1596.

The antenna module 1597 may transmit or receive a signal or power to or from the outside (e.g., the external electronic device) of the electronic device 1501. According to an embodiment, the antenna module 1597 may include an antenna including a radiating element composed of a conductive material or a conductive pattern formed in or on a substrate (e.g., PCB). According to an embodiment, the antenna module 1597 may include a plurality of antennas. In such a case, at least one antenna appropriate for a communication scheme used in the communication network, such as the first network 1598 or the second network 1599, may be selected, for example, by the communication module 1590 (e.g., the wireless communication module 1592) from the plurality of antennas. The signal or the power may then be transmitted or received between the communication module 1590 and the external electronic device via the selected at least one antenna. According to an embodiment, another component (e.g., a radio frequency integrated circuit (RFIC)) other than the radiating element may be additionally formed as part of the antenna module 1597.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 1501 and the external electronic device 1504 via the server 1508 coupled with the second network 1599. Each of the electronic devices 1502 and 1504 may be a device of a same type as, or a different type, from the electronic device 1501. According to an embodiment, all or some of operations to be executed at the electronic device 1501 may be executed at one or more of the external electronic devices 1502, 1504, or 1508. For example, if the electronic device 1501 should perform a function or a service automatically, or in response to a request from a user or another device, the electronic device 1501, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1501. The electronic device 1501 may provide the outcome, with or without further processing of the outcome, as at least part of a reply to the request. To that end, a cloud computing, distributed computing, or client-server computing technology may be used, for example.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

Figure 16:
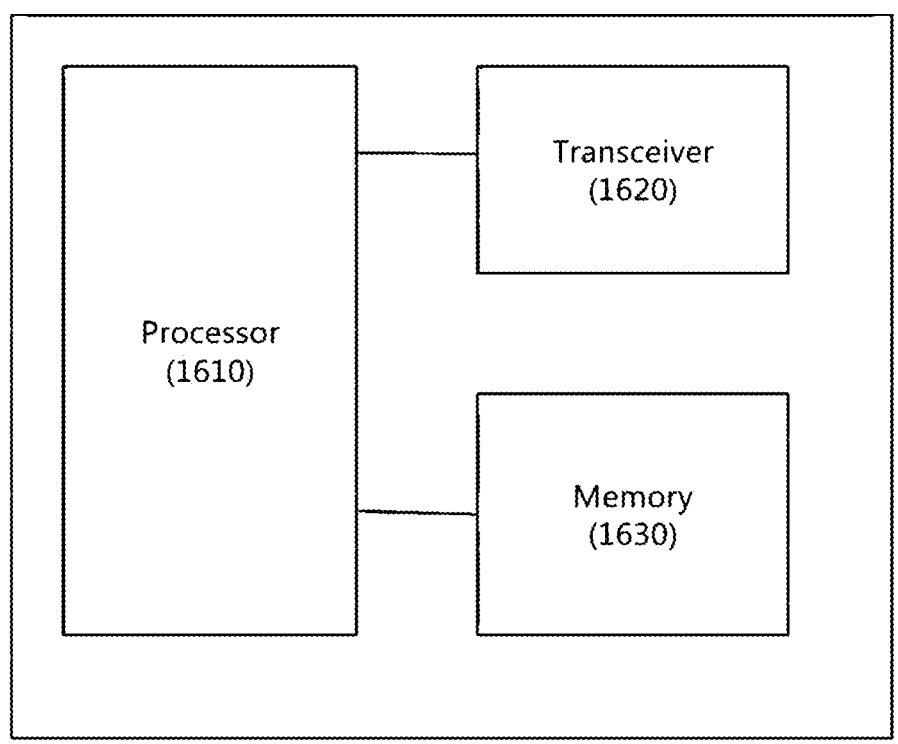
FIG. 16 schematically illustrates a Base station according to an exemplary embodiment.

FIG. 16 schematically illustrates a Base station according to embodiments of the present disclosure.

Referring to the FIG. 16, the Base station 1600 may include a processor 1610, a transceiver 1620 and a memory 1630. However, all of the illustrated components are not essential. The Base station 1600 may be implemented by more or less components than those illustrated in FIG. 16. In addition, the processor 1610 and the transceiver 1620 and the memory 1630 may be implemented as a single chip according to another embodiment.

The aforementioned components will now be described in detail.

The processor 1610 may include one or more processors or other processing devices that control the proposed function, process, and/or method. Operation of the Base station 1600 may be implemented by the processor 1610.

The transceiver 1620 may include a RF transmitter for up-converting and amplifying a transmitted signal, and a RF receiver for down-converting a frequency of a received signal. However, according to another embodiment, the transceiver 1620 may be implemented by more or less components than those illustrated in components.

The transceiver 1620 may be connected to the processor 1610 and transmit and/or receive a signal. The signal may include control information and data. In addition, the transceiver 1620 may receive the signal through a wireless channel and output the signal to the processor 1610. The transceiver 1620 may transmit a signal output from the processor 1610 through the wireless channel.

The memory 1630 may store the control information or the data included in a signal obtained by the Base station 1600. The memory 1630 may be connected to the processor 1610 and store at least one instruction or a protocol or a parameter for the proposed function, process, and/or method. The memory 1630 may include read-only memory (ROM) and/or random access memory (RAM) and/or hard disk and/or CD-ROM and/or DVD and/or other storage devices.

In an exemplary embodiment, the processor 1610 configured to generate indication information related to a power control parameter set of a channel for transmitting data with a first priority and transmit the indication information to a User Equipment (UE).

In an exemplary embodiment, the processor 1610 configured to receive a power margin report from the UE, wherein generating indication information comprises: generating the indication information based on the received power margin report.

In an exemplary embodiment, the processor 1610 configured to generate the indication information based on the received power margin report, wherein the power control parameter set comprises a first power control parameter set for setting a first power and a second power control parameter set for setting a second power and wherein the second power is greater than the first power. In an exemplary embodiment, the processor 1610 configured to, if the power margin comprises a first power margin indicating a difference value between the first power and a maximum transmission power of the UE and the first power margin is less than 0, indicate, in the indication information, scheduling parameters for adjusting the channel for transmitting the data with the first priority, and instructing to transmit the data with the first priority on idle resources. In an exemplary embodiment, the processor 1610 configured to, if the power margin comprises a second power margin indicating a second difference value between the second power and the maximum transmission power of the UE and the second power margin is greater than 0, instruct, in the indication information, to transmit the data with the first priority on resources which have been occupied by data with a second priority. In an exemplary embodiment, the processor 1610 configured to, if the power margin comprises the second power margin indicating the second difference value between the second power and the maximum transmission power of the UE and the second power margin is less than 0, or if the power margin comprises the first power margin indicating the difference value between the first power and the maximum transmission power of the UE and the first power margin is greater than 0, instruct, in the indication information, to transmit the data with the first priority on the idle resources.

Figure 17:
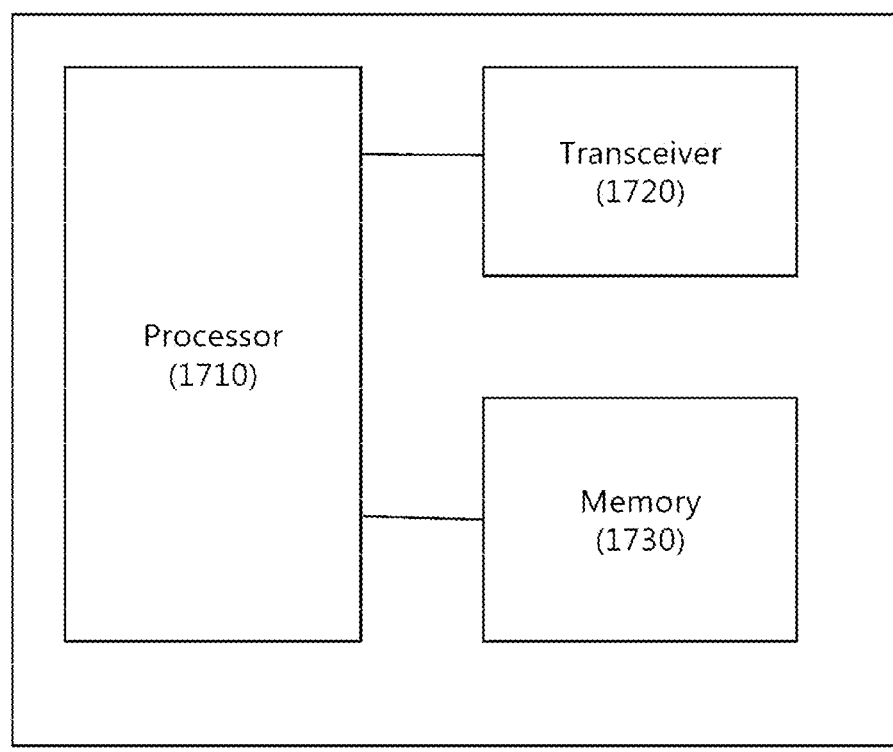
FIG. 17 illustrates a user equipment (UE) according to an exemplary embodiment.

FIG. 17 illustrates a user equipment (UE) according to embodiments of the present disclosure.

Referring to the FIG. 17, the UE 1700 may include a processor 1710, a transceiver 1720 and a memory 1730. However, all of the illustrated components are not essential. The UE 1700 may be implemented by more or less components than those illustrated in FIG. 17. In addition, the processor 1710 and the transceiver 1720 and the memory 1730 may be implemented as a single chip according to another embodiment.

The aforementioned components will now be described in detail.

The processor 1710 may include one or more processors or other processing devices that control the proposed function, process, and/or method. Operation of the UE 1700 may be implemented by the processor 1710.

The transceiver 1720 may include a RF transmitter for up-converting and amplifying a transmitted signal, and a RF receiver for down-converting a frequency of a received signal. However, according to another embodiment, the transceiver 1720 may be implemented by more or less components than those illustrated in components.

The transceiver 1720 may be connected to the processor 1710 and transmit and/or receive a signal. The signal may include control information and data. In addition, the transceiver 1720 may receive the signal through a wireless channel and output the signal to the processor 1710. The transceiver 1720 may transmit a signal output from the processor 1710 through the wireless channel.

The memory 1730 may store the control information or the data included in a signal obtained by the UE 1700. The memory 1730 may be connected to the processor 1710 and store at least one instruction or a protocol or a parameter for the proposed function, process, and/or method. The memory 1730 may include read-only memory (ROM) and/or random access memory (RAM) and/or hard disk and/or CD-ROM and/or DVD and/or other storage devices.

In an exemplary embodiment, the processor 1710 configured to determine whether indication information is received from a base station, determine a power control parameter set for transmitting data with a first priority based on whether the indication information is received and control a transmission power of a channel for transmitting the data with the first priority based on the determined power control parameter set.

In an exemplary embodiment, if the indication information is received, the processor 1710 configured to determine whether the data with the first priority is transmitted on idle resources or on resources which have been occupied by data with a second priority based on the indication information; and if the data with the first priority is transmitted on the idle resources, the processor 1710 configured to that the power control parameter set is a first power control parameter set for setting a first power, and if the data with the first priority is transmitted on the resources which have been occupied by the data with the second priority, the processor 1710 configured to that the power control parameter set is a second power control parameter set for setting a second power, wherein the second power is greater than the first power, and a priority of the transmission of the data with the first priority is higher than that of the transmission of the data with the second priority, and if the indication information is not received, the processor 1710 configured to determine, by default, that the data with the first priority is transmitted on the resources which have been occupied by the data with the second priority, and select a corresponding power control parameter set based on the default determination.

In an exemplary embodiment, the processor 1710 configured to report a transmission power margin to the base station, wherein the indication information is generated by the base station based on the reported power margin.

In an exemplary embodiment, the processor 1710 configured to calculate a difference value between the first power and a maximum transmission power of the UE as a first power margin, calculate a second difference value between the second power and the maximum transmission power of the UE as a second power margin, compare the first power margin and the second power margin with 0 and report a transmission power margin to the base station based on a comparison result. wherein a power control parameter set of the UE comprises a first power control parameter set for setting a first power and a second power control parameter set for setting a second power, wherein the second power is greater than the first power.

In an exemplary embodiment, the processor 1710 configured to, when the first power margin is less than 0 and the second power margin is less than 0, report the first power margin to the base station.

In an exemplary embodiment, the processor 1710 configured to, when the first power margin is greater than 0 and the second power margin is greater than 0, report the second power margin to the base station.

In an exemplary embodiment, the processor 1710 configured to, when the first power margin is greater than 0 and the second power margin is less than 0, report the first power margin or the second power margin to the base station.

Although the present disclosure has been described with an exemplary embodiment, various changes and modifications may be suggested to one skilled in the art. It is intended that the present disclosure encompass such changes and modifications as fall within the scope of the appended claims.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used herein, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 1540) including one or more instructions that are stored in a storage medium (e.g., internal memory 1536 or external memory 1538) that is readable by a machine (e.g., the electronic device 1501). For example, a processor (e.g., the processor 1520) of the machine (e.g., the electronic device 1501) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

The above description is merely a part of embodiments of the present application. It should be illustrated that those of ordinary skill in the art can also make several improvements and retouches without departing from the principle of the present application, and these improvements and retouches should be considered as falling within the protection scope of the present application.

Although the present disclosure has been described with various embodiments, various changes and modifications may be suggested to one skilled in the art. It is intended that the present disclosure encompass such changes and modifications as fall within the scope of the appended claims.

What is claimed is:

1. A method for operating a user equipment (UE) in a wireless communication system, the method comprising:
   determining a transmission power margin based on a power control parameter set determined according to a status of resource allocation;
   transmitting the transmission power margin to a base station;
   determining whether indication information is received from a base station;
   determining the power control parameter set of a grant-free channel for transmitting data with a first priority based on whether the indication information is received, wherein the indication information is determined based on the transmission power margin; and
   controlling a transmission power of the grant-free channel for transmitting the data with the first priority based on the determined power control parameter set.

2. The method of claim 1, wherein determining the power control parameter set for transmitting data with the first priority based on whether the indication information is received comprises:
   determining whether the data with the first priority is transmitted on idle resources or on resources which have been occupied by data with a second priority based on the indication information in case that the indication information is received from the base station,
   wherein a priority of the transmission of the data with the first priority is higher than that of the transmission of the data with the second priority.

3. The method of claim 2, wherein determining whether the data with the first priority is transmitted on the idle resources or on resources which have been occupied by data with the second priority based on the indication information comprises:
   determining that the power control parameter set is a first power control parameter set for setting a first power, in case that the data with the first priority is transmitted on the idle resources.

4. The method of claim 2, wherein determining whether the data with the first priority is transmitted on the idle resources or on resources which have been occupied by data with the second priority based on the indication information comprises:
   determining that the power control parameter set is a second power control parameter set for setting a second power in case that the data with the first priority is transmitted on the resources which have been occupied by the data with the second priority,
   wherein the second power is greater than a first power.

5. The method of claim 1, wherein determining a power control parameter set for transmitting data with a first priority based on whether the indication information is received comprises:
   determining, by default, that the data with the first priority is transmitted on resources which have been occupied by data with a second priority in case that the indication information is not received; and
   selecting a corresponding power control parameter set based on the default determination.

6. The method of claim 1, wherein determining the transmission power margin based on the power control parameter set determined according to the status of resource allocation comprises:
   determining a first power margin and a second power margin based on a maximum transmission power of the UE and the power control parameter set including a first power control parameter set and a second power control parameter set and
   determining the transmission power margin based on the first power margin and the second power margin.

7. The method of claim 6, wherein determining the transmission power margin comprises:
   calculating a difference value between a first power and the maximum transmission power as the first power margin;
   calculating a difference value between a second power and the maximum transmission power as the second power margin;
   comparing the first power margin and the second power margin with 0; and
   determining the transmission power margin based on a comparison result,
   wherein the first power control parameter set includes the first power for transmitting the data on idle resources,
   wherein the second power control parameter set the second power for transmitting the data on the idle resources which have been occupied by the data with a second priority, and
   wherein the second power is greater than the first power.

8. The method of claim 6, wherein transmitting the transmission power margin to the base station comprises:
transmitting, to the base station, the first power margin, when the first power margin is less than 0 and the second power margin is less than 0.

9. The method of claim 6, wherein transmitting the transmission power margin to the base station comprises:
transmitting, to the base station, the second power margin when the first power margin is greater than 0 and the second power margin is greater than 0.

10. The method of claim 6, transmitting the transmission power margin to the base station comprises:
transmitting, to the base station, the first power margin or the second power margin when the first power margin is greater than 0 and the second power margin is less than 0.

11. The method of claim 6, further comprising:
comparing the first power margin with a first threshold value or comparing the second power margin with a second threshold value; and
triggering the transmitting of the transmission power margin to the base station, when the first power margin is less than the first threshold value or the second power margin is less than the second threshold value.

12. The method of claim 1,
wherein the data with the first priority is Ultra Reliability Low Latency Communication (URLLC) data, and
wherein data with a second priority is enhanced Mobile BroadBand (eMBB) data.

13. A method for operating a base station in a wireless communication system, the method comprising:
receiving, from a User Equipment (UE), a transmission power margin wherein the power margin is determined based on a power control parameter set determined according to a status of resource allocation;
generating indication information related to a power control parameter set of a grant-free channel for transmitting data with a first priority based on the transmission power margin; and
transmitting the indication information the UE.

14. The method of claim 13,
wherein the power control parameter set comprises a first power control parameter set for setting a first power and a second power control parameter set for setting a second power, and wherein the second power is greater than the first power.

15. The method of claim 14, wherein generating the indication information based on the transmission power margin comprises:
indicating, in the indication information, scheduling parameters for adjusting the grant-free channel for transmitting the data with the first priority, and instructing to transmit the data with the first priority on idle resources in case that the transmission power margin comprises a first power margin indicating a difference value between the first power and a maximum transmission power of the UE and the first power margin is less than 0.

16. The method of claim 14, wherein generating the indication information based on the transmission power margin report comprises:
instructing, in the indication information, to transmit the data with the first priority on resources which have been occupied by data with a second priority in case that the transmission power margin comprises a second power margin indicating a second difference value between the second power and a maximum transmission power of the UE and the second power margin is greater than 0.

17. The method of claim 14, wherein generating the indication information based on the transmission power margin comprises:
instructing, in the indication information, to transmit the data with the first priority on idle resources in case that the transmission power margin comprises a second power margin indicating a second difference value between the second power and a maximum transmission power of the UE and the second power margin is less than 0, or the transmission power margin report comprises a first power margin indicating a difference value between the first power and the maximum transmission power of the UE and the first power margin is greater than 0.

18. A User Equipment (UE) in a wireless communication system, the UE comprising:
a transceiver;
a memory configured to store at least one instruction; and
a processor configured to:
determine a transmission power margin based on a power control parameter set determined according to a status of resource allocation,
transmit the transmission power margin to a base station,
determine whether indication information is received from the base station,
determine the power control parameter set of a grant-free channel for transmitting data with a first priority based on whether the indication information is received, wherein the indication information is determined based on the transmission power margin, and
control a transmission power of the grant-free channel for transmitting the data with the first priority based on the determined power control parameter set.

19. The UE of claim 18, wherein the processor is configured to determine a first power margin and a second power margin based on a maximum transmission power of the UE and the power control parameter set including a first power control parameter set and a second power control parameter set, and
determine the transmission power margin based on the first power margin and the second power margin.

* * * * *